US010724703B2

(12) United States Patent
Nishimura et al.

(10) Patent No.: US 10,724,703 B2
(45) Date of Patent: Jul. 28, 2020

(54) VEHICULAR LAMP

(71) Applicant: STANLEY ELECTRIC CO., LTD., Tokyo (JP)

(72) Inventors: Shota Nishimura, Tokyo (JP); Kazuma Kamioka, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/235,471

(22) Filed: Dec. 28, 2018

(65) Prior Publication Data
US 2019/0203900 A1 Jul. 4, 2019

(30) Foreign Application Priority Data
Dec. 28, 2017 (JP) ................. 2017-254074

(51) Int. Cl.
F21S 41/26 (2018.01)
F21S 41/141 (2018.01)
F21S 41/64 (2018.01)
F21S 41/27 (2018.01)
F21S 41/14 (2018.01)
B60Q 1/04 (2006.01)
F21S 41/151 (2018.01)
(Continued)

(52) U.S. Cl.
CPC .............. F21S 41/645 (2018.01); B60Q 1/04 (2013.01); F21S 41/18 (2018.01); F21S 41/26 (2018.01); F21S 41/27 (2018.01); F21S 41/14 (2018.01); F21S 41/143 (2018.01); F21S 41/151 (2018.01); F21S 41/663 (2018.01)

(58) Field of Classification Search
CPC ................. F21S 41/26; F21S 41/141

USPC ......................................... 362/539
See application file for complete search history.

(56) References Cited

U.S. PATENT DOCUMENTS

2017/0030543 A1 2/2017 Gromfeld et al.
2017/0130923 A1* 5/2017 Nishimura ............ F21S 41/24
(Continued)

FOREIGN PATENT DOCUMENTS

CN 1948821 A 4/2007
CN 106641964 A 5/2017
(Continued)

OTHER PUBLICATIONS

Extended European Search Report for the related European Patent Application No. 18248298.4 dated May 31, 2019.

Primary Examiner — Christopher M Raabe
(74) Attorney, Agent, or Firm — Kenealy Vaidya LLP

(57) ABSTRACT

A vehicular lamp comprising a front lens body extending in a predetermined direction, and a first optical system and a second optical system disposed adjacent to each other along the predetermined direction behind the front lens body, the first optical system includes a first rear lens unit, and a first light source which emits light which is irradiated forward permeating the first rear lens unit and the front lens body, the second optical system includes a second rear lens unit, and a second light source which emits light which is irradiated forward permeating the second rear lens unit and the front lens body, wherein the light from the first light source forms a first light emitting region in the front lens body, and the light from the second light source forms a second light emitting region which overlaps with the first light emitting region in the front lens body.

18 Claims, 21 Drawing Sheets

(51) Int. Cl.
*F21S 41/143* (2018.01)
*F21S 41/663* (2018.01)

(56) References Cited

U.S. PATENT DOCUMENTS

2017/0211775 A1* 7/2017 Potter .................. F21S 41/323
2017/0241605 A1* 8/2017 Yamamoto ............ F21S 41/338
2018/0187851 A1* 7/2018 Hossfeld ............... F21S 41/143

FOREIGN PATENT DOCUMENTS

| EP | 3 173 687 A1 | 5/2017 |
| EP | 3 343 091 A1 | 7/2018 |
| EP | 3 473 917 A1 | 4/2019 |
| JP | 2017-047815 A | 3/2017 |

* cited by examiner

VEHICULAR LAMP

CROSS-REFERENCE TO RELATED APPLICATION

This application is based upon and claims the benefit of priority of the prior Japanese Patent Application No. 2017-254074, filed on Dec. 28, 2017, the entire contents of which are incorporated herein by reference.

FIELD

The present invention relates to a vehicular lamp. More particularly, the present invention relates to a vehicular lamp having a light emitting region which does not change (or hardly changes) both when a first light source is turned off and a second light source is turned on, and when the first light source and the second light source are simultaneously turned on.

BACKGROUND

There is known a vehicular lamp including a low beam optical system including a low beam lens and a low beam light source, and a high beam optical system including a high beam lens and a high beam light source (see, for example, Patent Document 1 (FIG. 1, etc.)).

In Patent Document 1, a low beam light distribution pattern can be formed by turning off the high beam light source and turning on the low beam light source. In addition, a high beam light distribution pattern can be formed by simultaneously turning on the high beam light source and the low beam light source.

PRIOR ART

[Patent Document 1] Japanese Laid-open Patent Publication No. 2017-47815

SUMMARY

However, in Patent Document 1, when the high beam light source is turned off and the low beam light source is turned on, only the low beam lens emits light without the high beam lens emitting light. On the other hand, when the high beam light source and the low beam light source are simultaneously turned on, both the high beam lens and the low beam lens emit light.

In this way, in Patent Document 1, there is a problem in that the light emitting region changes both when the high beam light source is turned off and the low beam light source is turned on, and when the high beam light source and the low beam light source are simultaneously turned on.

The present invention has been made in light of the above circumstances, and it is an object of the present invention to provide a vehicular lamp having a light emitting region which does not change (or hardly changes) both when a first light source (for example, a high beam light source or an ADB light source) is turned off and a second light source (for example, a low beam light source) is turned on, and when the first light source and the second light source are simultaneously turned on.

A vehicular lamp comprising: a front lens body extending in a predetermined direction; and a first optical system and a second optical system disposed adjacent to each other along the predetermined direction behind the front lens body, the first optical system includes: a first rear lens unit disposed behind the front lens body; and a first light source which is disposed behind the first rear lens unit and emits light which is irradiated forward permeating the first rear lens unit and the front lens body in that order to form a first headlamp light distribution pattern, the second optical system includes: a second rear lens unit disposed behind the front lens body; and a second light source which is disposed behind the second rear lens unit and emits light which is irradiated forward permeating the second rear lens unit and the front lens body in that order to form a second headlamp light distribution pattern, wherein the light from the first light source which permeates the first rear lens unit and the front lens body forms a first light emitting region in the front lens body, and the light from the second light source which permeates the second rear lens unit and the front lens body forms a second light emitting region which at least partially overlaps with the first light emitting region in the front lens body.

According to this aspect, there can be provided a vehicular light having a light emitting region which does not change (or hardly changes) both when a first light source (for example, a high beam light source or an ADB light source) is turned off and a second light source (for example, a low beam light source) is turned on, and when the first light source and the second light source are simultaneously turned on.

This is because, when the first light source is turned off and the second light source is turned on, the light from the second light source which permeates the second rear lens unit and the front lens body in that order forms the second light emitting region which at least partially overlaps with the first light emitting region in the front lens body.

A preferred aspect of the above-mentioned invention is characterized in that a diffusion angle in horizontal direction of the light from the first light source which permeates the first rear lens unit and the front lens body is a first diffusion angle, a diffusion angle in horizontal direction of the light from the second light source which permeates the second rear lens unit and the front lens body is a second diffusion angle, the second diffusion angle is larger than the first diffusion angle.

According to this aspect, there can be provided a vehicular light having a light emitting region which does not change (or hardly changes) both when a first light source (for example, a high beam light source or an ADB light source) is turned off and a second light source (for example, a low beam light source) is turned on, and when the first light source and the second light source are simultaneously turned on.

This is because, when the first light source is turned off and the second light source is turned on, the light from the second light source which permeates the second rear lens unit and the front lens body in that order is horizontally diffused at the second diffusion angle which is larger than the first diffusion angle, to thereby form the second light emitting region which at least partially overlaps with the first light emitting region in the front lens body.

In addition, a preferred aspect of the above-mentioned invention is characterized in that the vehicular lamp according to claim 1, wherein a surface shape of a light exit surface of the first rear lens unit is adjusted so that the diffusion angle in horizontal direction of the light from the first light source which permeates the first rear lens unit and the front lens body becomes the first diffusion angle, a surface shape of a light exit surface of the second rear lens unit is adjusted so that the diffusion angle in horizontal direction of the light from the second light source which permeates the second rear lens unit and the front lens body becomes the second diffusion angle.

In addition, a preferred aspect of the above-mentioned invention is characterized in that the first rear lens unit is a lens unit configured to condense, in a first direction, light from the first light source which permeates the first rear lens unit, the second rear lens unit is a lens unit configured to condense, in the first direction, light from the second light source which permeates the second rear lens unit, the front lens body is a lens unit configured to condense, in a second direction orthogonal to the first direction, light from the first rear lens unit and the second rear lens unit which permeates the front lens body.

In addition, a preferred aspect of the above-mentioned invention is characterized in that the front lens body includes: a light incident surface extending in the predetermined direction; and a light exiting surface extending in the predetermined direction on a side opposite to the light incident surface, the light incident surface is a surface at which light from the first and second optical systems enters the front lens body, the light exiting surface is a surface at which light from the first and second optical systems which has entered from the light incident surface exits, and at least one of the light incident surface and the light exiting surface is a cylindrical surface in which a cylindrical axis extends in the predetermined direction.

In addition, a preferred aspect of the above-mentioned invention is characterized in that the first optical system is a high beam optical system including a high beam rear lens unit disposed behind the front lens body and a high beam light source disposed behind the high beam rear lens unit and emits light which is irradiated forward permeating the high beam rear lens unit and the front lens body in that order to form a high beam light distribution pattern, or an ADB optical system including an ADB rear lens unit disposed behind the front lens body; and an ADB light source which is disposed behind the ADB rear lens body and emits light which is irradiated forward permeating the ADB rear lens unit and the front lens body in that order to form an ADB light distribution pattern, and the second optical system is a low beam optical system including a low beam rear lens unit disposed behind the front lens body and a low beam light source disposed behind the low beam rear lens unit and emits light which is irradiated forward permeating the low beam rear lens unit and the front lens body in that order to form a low beam light distribution pattern.

In addition, a preferred aspect of the above-mentioned invention is characterized in that the front lens body is disposed while being inclined at a receding angle with respect to a reference axis which extends in a vehicle width direction when viewed from above, and the first optical system is disposed ahead of the second optical system.

DESCRIPTION OF EMBODIMENTS

A vehicular lamp 10 according to an embodiment of the present invention is described below with reference to the attached drawings. Corresponding components in each drawing are denoted by the same reference symbols and overlapping descriptions are omitted.

Figure 1:
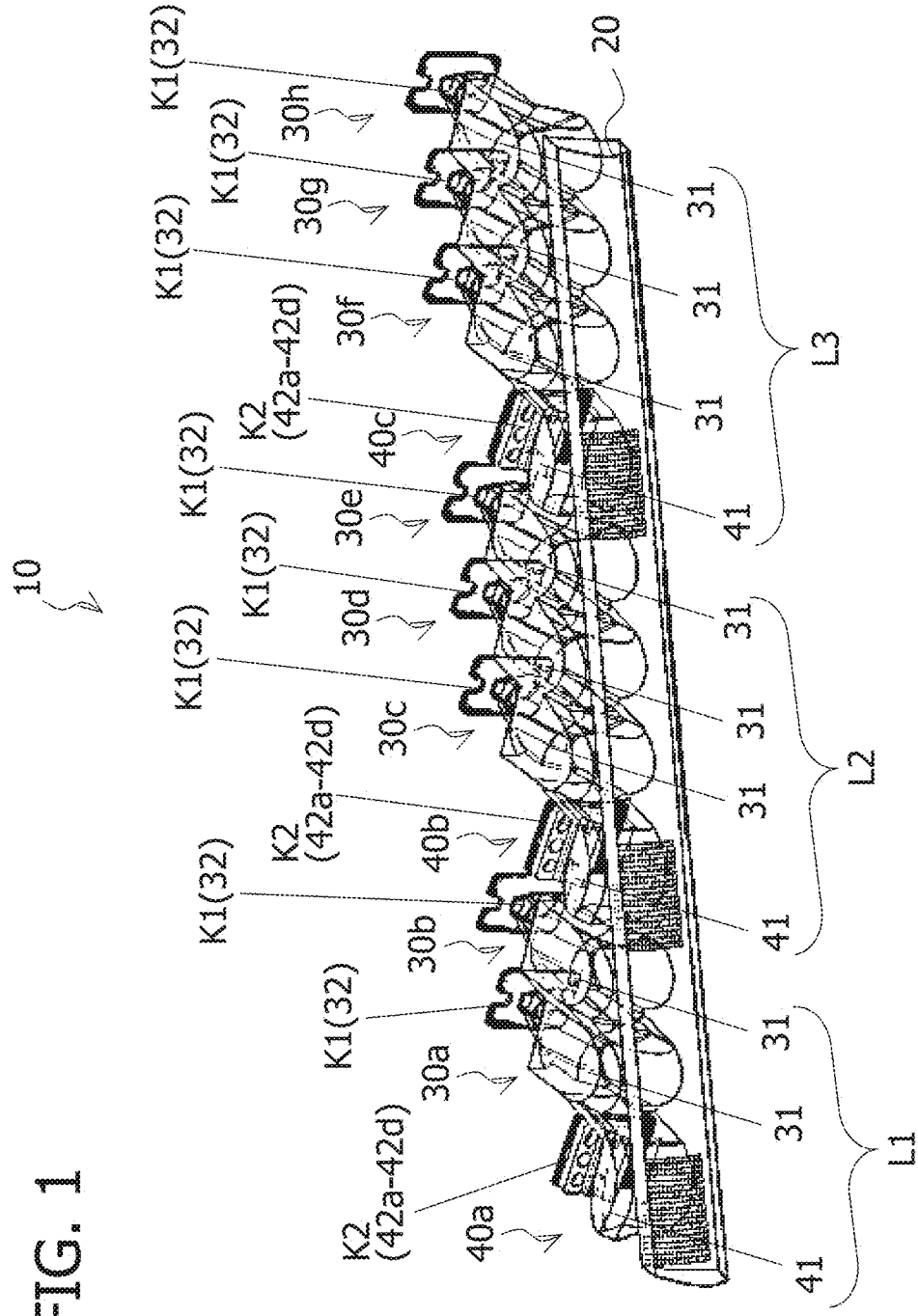
FIG. 1 is a perspective view of the vehicular light 10.
Figure 2:
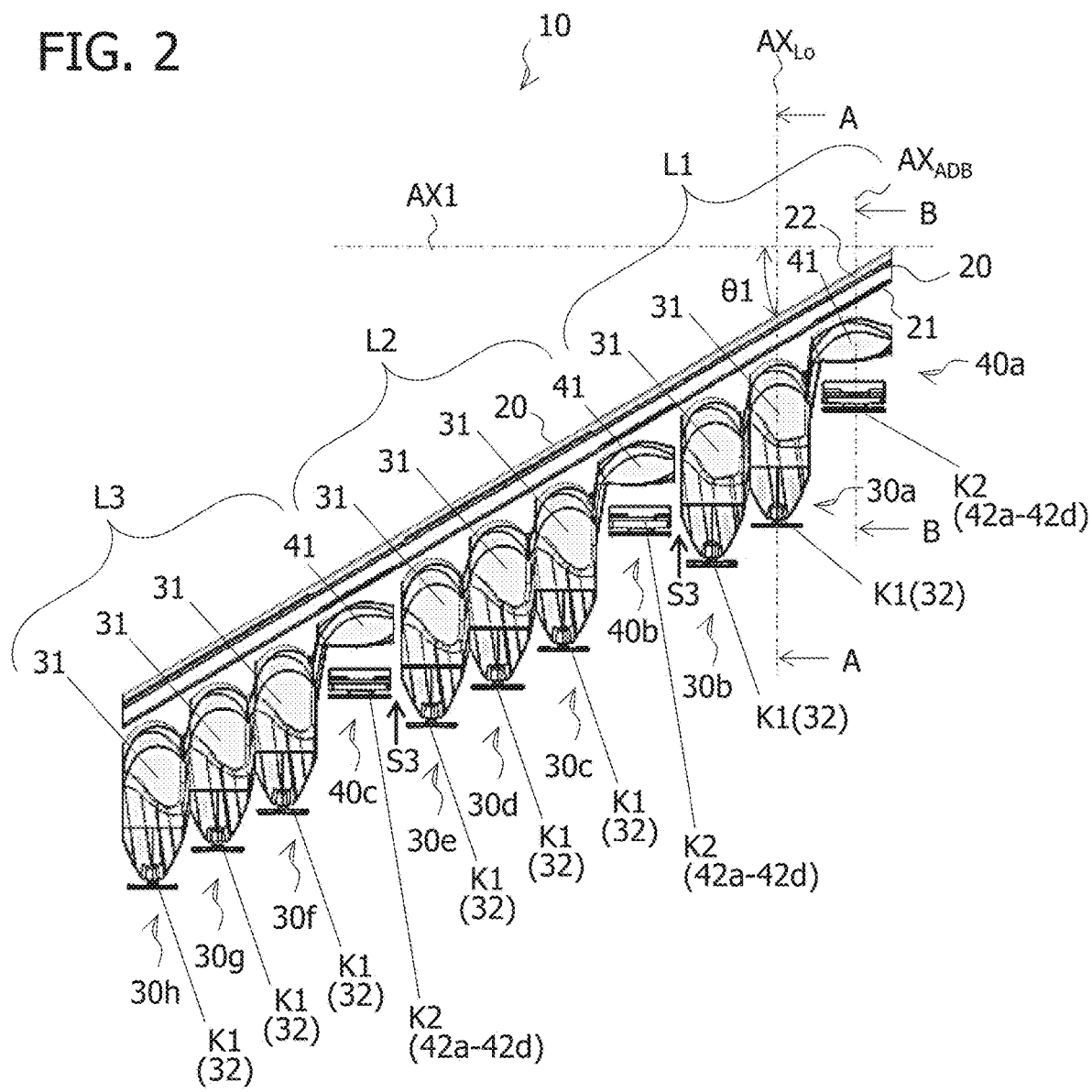
FIG. 2 is a top view of the vehicular light 10.
Figure 3:
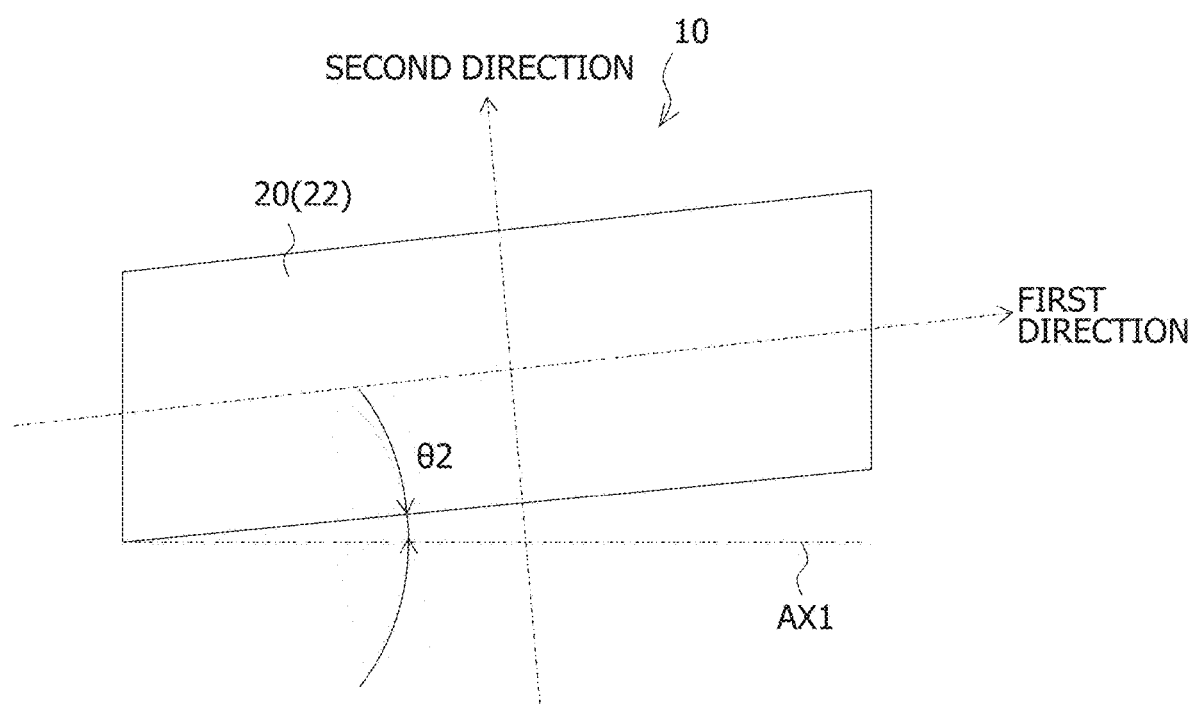
FIG. 3 is a front view of the vehicular light 10.

FIG. 1 is a perspective view of the vehicular lamp 10. FIG. 2 is a top view of the vehicular lamp 10. FIG. 3 is a front view of the vehicular lamp 10.

The vehicular lamp 10 shown in FIGS. 1 to 3 is a vehicular headlamp (headlamp) and is mounted to, for example, the left and right sides on the front end of a vehicle such as an automobile. Because the vehicular lamp 10 to be mounted to both the left and right sides has a symmetrical configuration, a vehicular lamp 10 mounted to the left side at the front of a vehicle (left side facing the front of the vehicle) is described as a representative example of the vehicular lamp 10. Although not illustrated, the vehicle lamp 10 is arranged in a lamp chamber constituted by an outer lens and a housing and is attached to the housing or the like.

As illustrated in FIGS. 1 to 3, the vehicular lamp 10 includes a front lens body 20, low beam optical systems 30a to 30h and Adaptive Driving Beam (ADB) optical systems 40a to 40c (or high beam optical systems to be described later). The low beam optical systems 30a to 30h all have the same configuration. The ADB optical systems 40a to 40c also all have the same configuration. The low beam optical systems 30a to 30h are collectively referred to as "low beam optical system 30" in the following description if the low beam optical systems 30a to 30h do not need to be distinguished from each other. Likewise, the ADB optical systems 40a to 40c are collectively referred to as "ADB optical system 40" if the ADB optical systems 40a to 40c do not need to be distinguished from each other. The low beam optical system 30 corresponds to a second optical system according to the present invention, and the ADB optical system 40 corresponds to a first optical system according to the present invention.

The front lens body 20 is a lens unit that extends in a predetermined direction (also referred to as a first direction herein). The front lens body 20 is primarily responsible for condensing light from a rear lens unit (a low beam rear lens unit 31 and an ADB rear lens unit 41) which permeates the front lens body 20 in a second direction orthogonal to the first direction.

The front lens body 20 is formed through injection molding a transparent resin such as acrylic or polycarbonate. The predetermined direction is, for example, when viewed from above, a direction inclined by a receding angle θ1 with respect to a reference axis AX1 which extends in a vehicle width direction as illustrated in FIG. 2, and, when viewed from the front, a direction inclined by a splice angle θ2 with respect to the reference axis AX1 which extends in the vehicle width direction as illustrated in FIG. 3. The angles θ1 and θ2 are any angles from between 0° to 90°.

As illustrated in FIG. 2, the front lens body 20 includes a light incident surface 21 extending in the first direction and a light exiting surface 22 extending in the first direction on a side opposite to the light incident surface 21.

The light incident surface 21 is, for example, a flat surface (for example, a vertical surface). The light exiting surface 22 is formed as a semi-cylindrical surface (cylindrical surface) having a cylindrical axis extending (in a line) in the first direction for condensing, in the second direction orthogonal to the first direction, the light from the low beam optical system 30 and the ADB optical system 40 which exits from the light exiting surface 22.

The low beam optical system 30 and the ADB optical system 40 are disposed next to each other along the first direction behind the front lens body 20.

Figure 4:
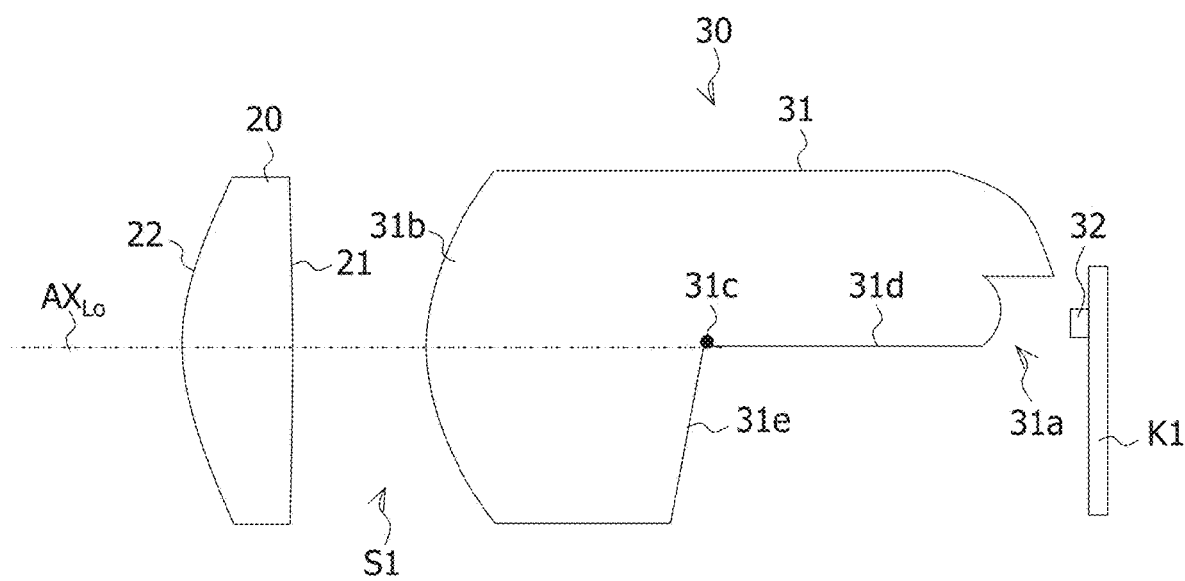
FIG. 4 is a longitudinal sectional diagram (sectional diagram taken along the line A-A in FIG. 2) of the low beam optical system 30.

FIG. 4 is a longitudinal sectional diagram (sectional diagram taken along the line A-A in FIG. 2) of the low beam optical system 30.

As illustrated in FIG. 4, the low beam optical system 30 includes the low beam rear lens unit 31 disposed behind the front lens body 20, and a low beam light source 32 disposed behind the low beam rear lens unit 31 and emits light which is horizontally irradiated forward at a second diffusion angle θ4 (see FIG. 10) larger than a first diffusion angle θ3 to be described later, permeating the low beam rear lens unit 31 and the front lens body 20 in that order to form a low beam light distribution pattern. The second diffusion angle θ4 is, for example, an angle from 30° to 40°. The second diffusion angle θ4 can be adjusted by, for example, altering the surface shape of a light exiting portion 31b of the low beam rear lens unit 31. The low beam rear lens unit 31 corresponds to a second rear lens unit according to the present invention.

In a general vehicular lamp, one projection lens is responsible for condensing light in the first direction and light in the second direction orthogonal to the first direction. In contrast, in this embodiment, two lenses (the front lens body 20 and the low beam rear lens unit 31) which make up a projection lens are responsible for condensing light in the first direction and light in the second direction orthogonal to the first direction. More specifically, in this embodiment, the low beam rear lens unit 31 is mainly responsible for condensing light in the first direction and the front lens body 20 is mainly responsible for condensing light in the second direction.

The low beam light source 32 is a semiconductor light emitting element such as an LED or LD having a rectangular (for example, a 1 mm$^2$) light emitting surface and is mounted to a substrate K1 with the light emitting surface facing forward (to the front). The substrate K1 is mounted to the housing (not shown) using a screw or another means.

The low beam rear lens unit 31 includes a light incident portion 31a (rear end portion), the light exiting portion 31b (front end portion) on the side opposite to the light incident portion 31a, an edge portion 31c provided between the light incident portion 31a and the light exiting portion 31b, a reflection surface 31d extending toward the rear from the edge portion 31c, and an extension surface 31e extending downward from the edge portion 31c. The low beam rear lens unit 31 is mainly responsible for condensing, in the first direction, light from the low beam light source 32 which permeates the low beam rear lens unit 31.

The light from the low beam light source 32 which has entered the low beam rear lens unit 31 from the light incident portion 31a is condensed toward the edge portion 31c in at least the vertical direction (up/down direction in FIG. 4). As a result, a low beam light distribution pattern becomes relatively bright around a cutoff line.

The light exiting portion 31b is formed as, for example, a semi-cylindrical surface (cylindrical surface) having a cylindrical axis extending in the second direction so as to condense, in the first direction, light from the low beam light source 32 which exits the light exiting portion 31b.

The edge portion 31c is formed into a shape corresponding to the cutoff line of the low beam light distribution pattern. Although not shown in the drawings, the edge portion 31c has, for example, a Z-shaped step portion.

In the low beam optical system 30 having the above-described configuration, when the low beam light source 32 is turned on, the light from the low beam light source 32 enters the low beam rear lens unit 31 from the light incident portion 31a and is partially blocked (shaded) by the reflection surface 31d. Then, the light exits from the light exiting portion 31b together with light reflected off the reflection surface 31d. At this time, the light exiting portion 31b acts to condense, in the first direction, the light from the low beam light source 32 which exits the light exiting portion 31b. Then, the light from the low beam light source 32 which has exited the light exiting portion 31b passes through a space S1 between the low beam rear lens unit 31 and the front lens body 20, further enters the front lens body 20 from the light incident surface 21 and is irradiated forward after exiting the light exiting surface 22. At this time, the light exiting surface 22 acts to condense, in the second direction, the light from the low beam light source 32 which exits the light exiting surface 22. Thereby, the low beam light distribution pattern is formed.

In other words, the light intensity distribution is formed in the vicinity of the edge portion 31c by the light from the low beam light source 32 that has entered the low beam rear lens unit 31. The low beam rear lens unit 31 (the light exiting portion 31b) and the front lens body 20 (which are functioning as a projection lens) project the light intensity distribution forward. Thereby, a low beam light distribution pattern is formed.

Figure 9A:
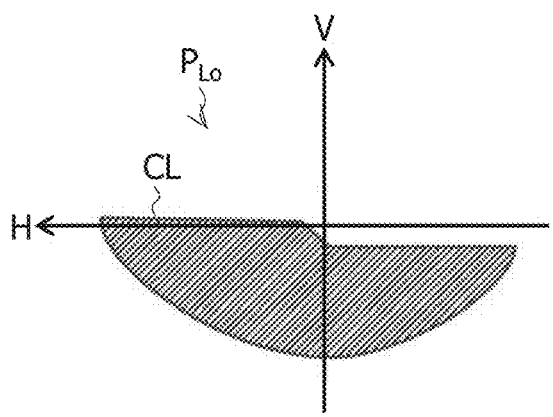
FIG. 9A is an example of a low beam light distribution pattern $P_{Lo}$.

FIG. 9A is an example of a low beam light distribution pattern $P_{Lo}$. FIG. 9A illustrates an example of the low beam light distribution pattern $P_{Lo}$ formed on an imaginary vertical screen (disposed approximately 25 m ahead of the front of the vehicle) opposing the front of the vehicle.

The low beam light distribution pattern $P_{Lo}$ includes a cutoff line CL defined by the edge portion 31c on an upper edge.

As described above, the light from the low beam light source 32 which permeates the low beam rear lens unit 31 and the front lens body 20 in that order forms a second light emitting region A2 which at least partially overlaps with a first light emitting region A1 to be described later in the front lens body 20.

Figure 10:
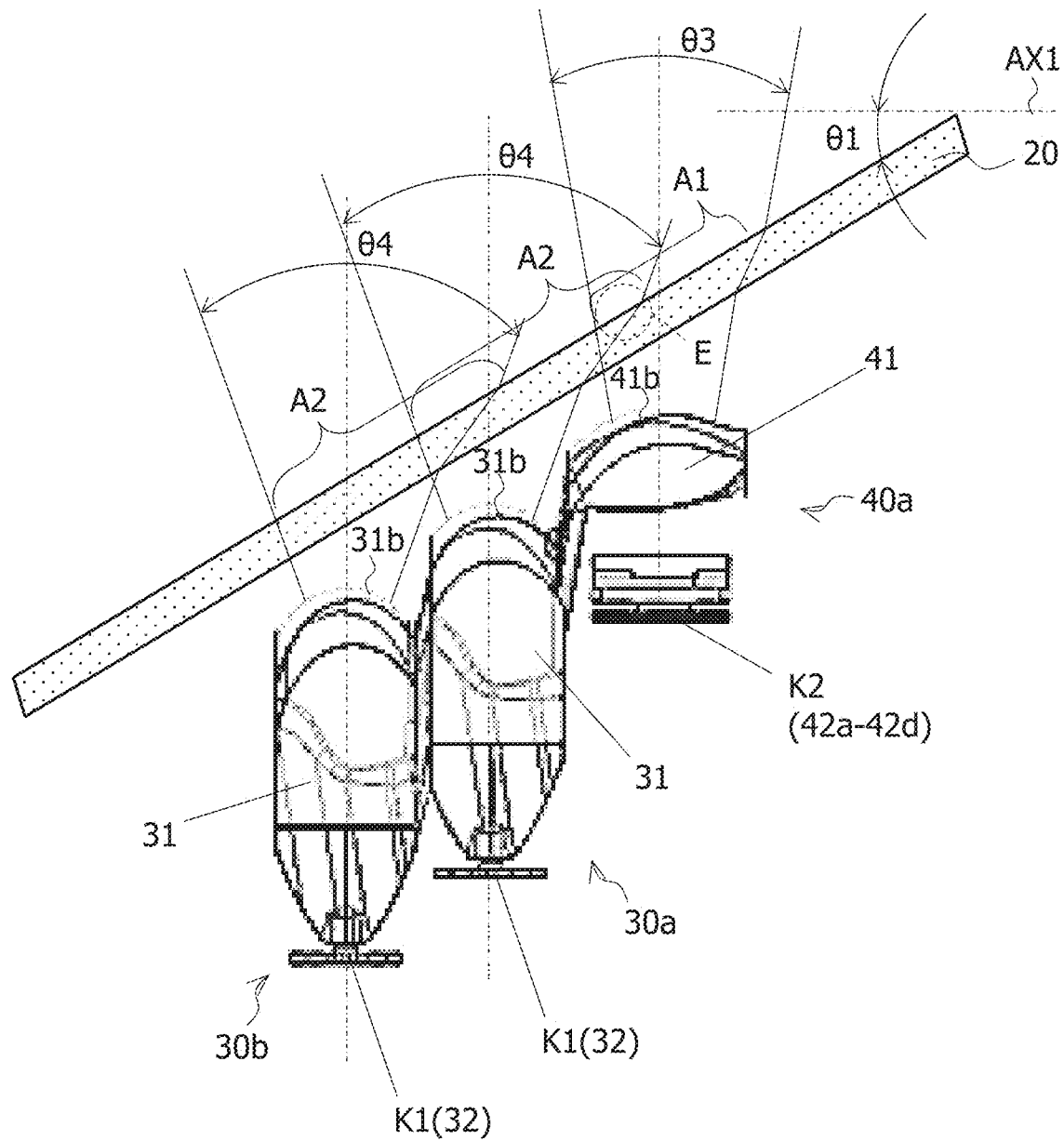
FIG. 10 is an example of the light emitting regions A1 and A2 formed in the front lens body 20.
Figure 11A:
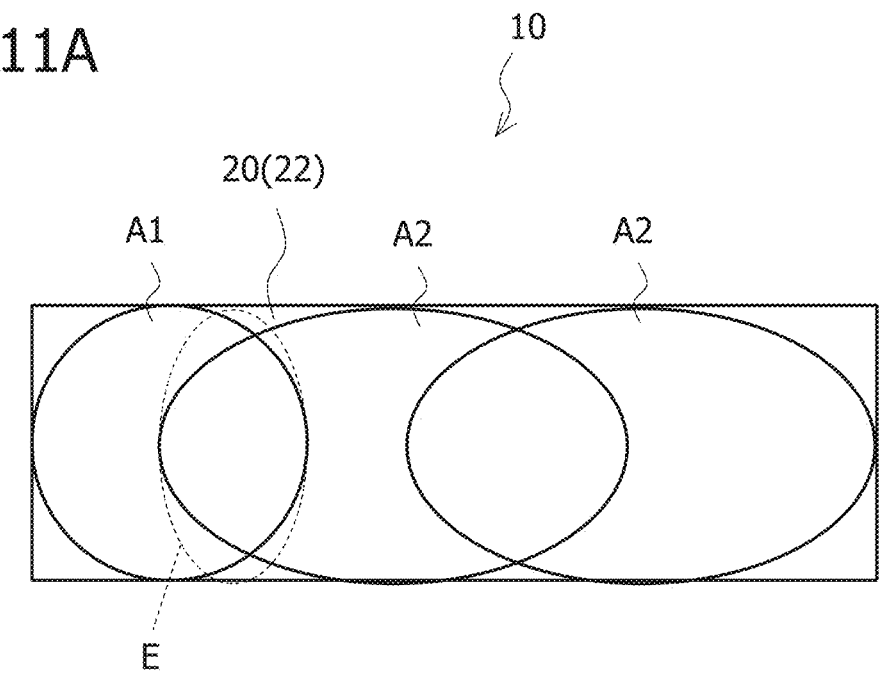
FIGS. 11A and 11B are examples of the light emitting regions A1 and A2 formed in the front lens body 20.

FIGS. 10 and 11 are examples of the light emitting regions A1 and A2 formed in the front lens body 20. FIG. 10 shows the light emitting regions A1 and A2 formed in the front lens body 20 from above. FIG. 11A shows the light emitting regions A1 and A2 formed in the front lens body 20 from the front. The symbol "E" in FIGS. 10 and 11A denotes a region in which the first light emitting region A1 and the second light emitting region A2 overlap.

In FIG. 10, the light from the low beam light source 32 which permeates the low beam rear lens unit 31 and the front lens body 20 in that order is irradiated in the range of the second diffusion angle θ4.

Figure 5A:
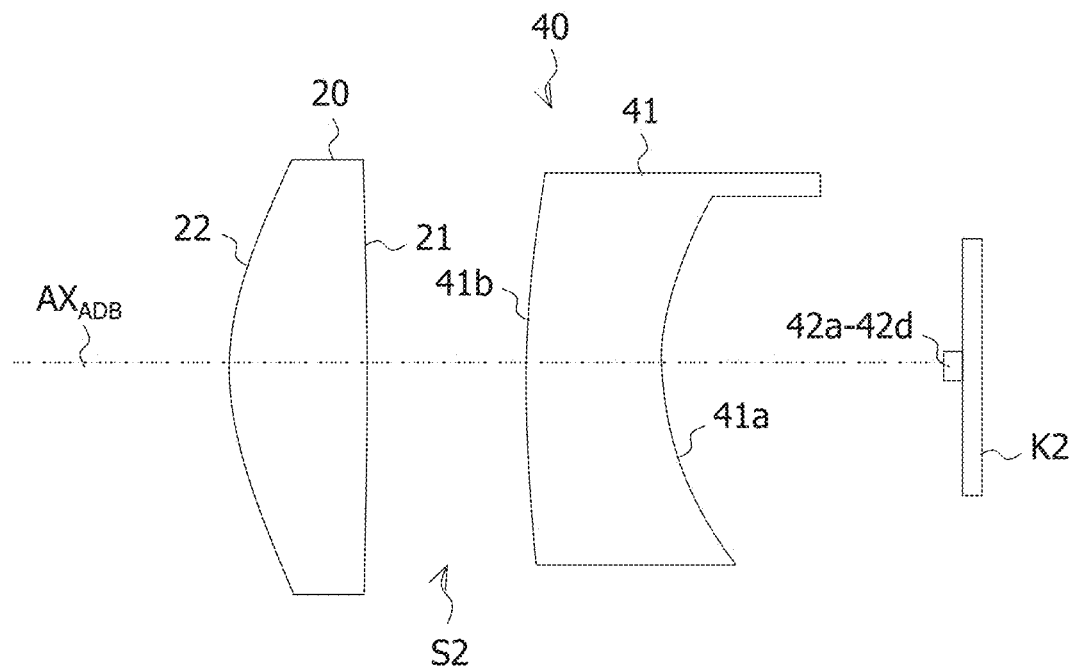
FIG. 5A is a longitudinal sectional view (view taken along the line B-B in FIG. 2) of the ADB optical system 40 and FIG. 5B is a front view of a substrate K2 mounted with ADB light sources 42a to 42d.
Figure 5B:
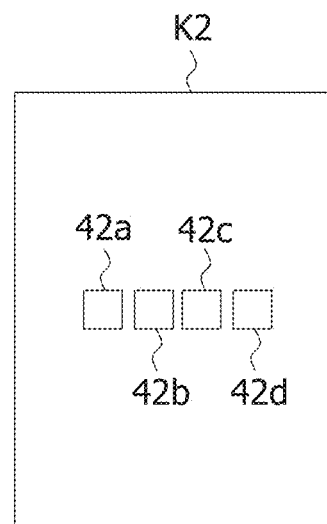

FIG. 5A is a longitudinal sectional view (view taken along the line B-B in FIG. 2) of the ADB optical system 40 and FIG. 5B is a front view of a substrate K2 mounted with ADB light sources 42a to 42d.

As illustrated in FIG. 5A, the ADB optical system 40 includes an ADB rear lens unit 41 disposed behind the front lens body 20, and the plurality of ADB light sources 42a to 42d which are disposed behind the ADB rear lens unit 41 and emits light which is irradiated forward in the horizontal direction at the first diffusion angle θ3 (see FIG. 10) permeating the ADB rear lens unit 41 and the front lens body 20 in that order to form an ADB light distribution pattern. The first diffusion angle θ3 is, for example, an angle around 20°. The first diffusion angle θ3 can be adjusted by, for example, altering the surface shape of a light exiting surface 41b of the ADB rear lens unit 41. The ADB rear lens unit 41 corresponds to a first rear lens unit according to the present invention.

In a general vehicular lamp, one projection lens is responsible for condensing light in the first direction and light in the second direction orthogonal to the first direction. In contrast, in this embodiment, two lenses (the front lens body 20 and the ADB rear lens unit 41) which make up a projection lens are responsible for condensing light in the first direction and light in the second direction orthogonal to the first direction. More specifically, in this embodiment, the ADB rear lens unit 41 is mainly responsible for condensing light in the first direction and the front lens body 20 is mainly responsible for condensing light in the second direction.

The ADB light sources 42a to 42d are each a semiconductor light emitting element such as an LED or LD having a rectangular (for example, a 1 mm$^2$) light emitting surface and, as illustrated in FIG. 5A, are mounted to the substrate K2 with the light emitting surface facing forward (to the front). The ADB light sources 42a to 42d are arranged in a row in the horizontal direction. The substrate K2 is mounted to the housing (not shown) using a screw or another means.

The ADB rear lens unit 41 includes a light incident surface 41a and a light exiting surface 41b on a side opposite to the light incident surface 41a. The ADB rear lens unit 41 is mainly responsible for condensing, in the first direction, light from the ADB light sources 42a to 42d which permeates the ADB rear lens unit 41.

The light incident surface 41a is a surface at which the light from the ADB light sources 42a to 42d enters the ADB rear lens unit 41.

The light exiting surface 41b is formed as, for example, a semi-cylindrical surface (cylindrical surface) having a cylindrical axis extending in the second direction so as to condense, in the first direction, the light from the ADB light source 42 exiting the light exiting surface 41b.

In the ADB optical system 40 with the above-described configuration, when the ADB light sources 42a to 42d are turned on, the light from the ADB light sources 42a to 42d enters the ADB rear lens unit 41 from the light incident surface 41a and then exits from the light exiting surface 41. At this time, the light exiting surface 41b acts to condense, in the first direction, the light from the ADB light sources 42a to 42d exiting from the light exiting surface 41b. Then, the light from the ADB light sources 42a to 42d which has exited the light exiting surface 41b passes through a space S2 between the ADB rear lens unit 41 and the front lens body 20, further enters the front lens body 20 from the light incident surface 21 and is irradiated forward after exiting from the light exiting surface 22. At this time, the light exiting surface 22 acts to condense, in the second direction, the light from the ADB light sources 42a to 42d which has exited the light exiting surface 22. With this configuration, an ADB light distribution pattern is formed.

In other words, the low beam rear lens unit 31 (the light exiting portion 31b) and the front lens body 20 (which are functioning as a projection lens) project light source images (the light intensity distribution) of the ADB light sources 42a to 42d forward. Thereby, a low beam light distribution pattern is formed.

Figure 9B:
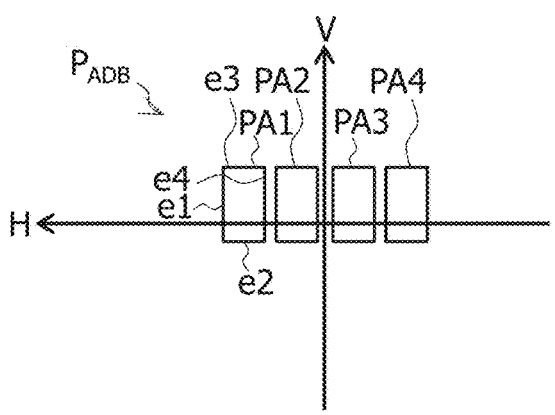
FIG. 9B is an example of an ADB light distribution pattern $P_{ADB}$.

FIG. 9B is an example of an ADB light distribution pattern $P_{ADB}$. FIG. 9B illustrates an example of the ADB light distribution pattern $P_{ADB}$ formed on the imaginary vertical screen.

The ADB light distribution pattern $P_{ADB}$ includes a plurality of irradiation patterns PA1 to PA4 which are individually turned on/off through the ADB light sources 42a to 42d being individually turned on/off.

As described above, the light from the ADB light sources 42a to 42b which permeates the ADB rear lens unit 41 and the front lens body 20 in that order forms, as illustrated in FIGS. 10 and 11A, the first light emitting region A1 in the front lens body 20. In FIG. 10, the light from the ADB light sources 42a to 42b which permeates the ADB rear lens unit 41 and the front lens body 20 in that order is irradiated in the range of the first diffusion angle θ3.

In the vehicular lamp 10 having the above-described configuration, a high beam light distribution pattern, which is a combination of the low beam light distribution pattern $P_{Lo}$ and the ADB light distribution pattern $P_{ADB}$, is formed by simultaneously turning on the low beam light sources 32 and the ADB light sources 42a to 42d.

Figure 9C:
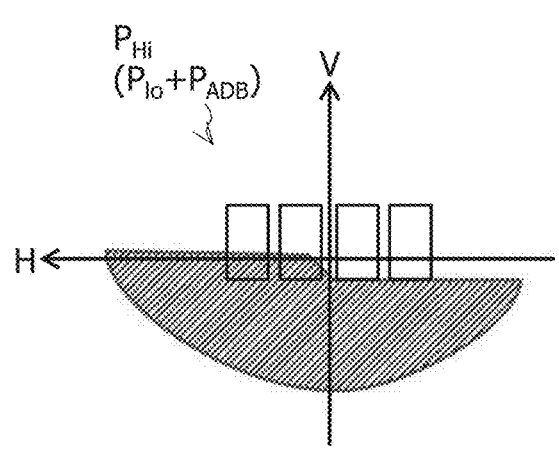
FIG. 9C is an example of a high beam light distribution pattern $P_{Hi}$.

FIG. 9C is an example of a high beam light distribution pattern $P_{Hi}$. FIG. 9C illustrates an example of the high beam light distribution pattern $P_{Hi}$ formed on the imaginary vertical screen.

As illustrated in FIG. 11A, the light emitting regions A1 and A2 are formed when the low beam light sources 32 and the ADB light sources 42a to 42d are simultaneously turned on. FIG. 11A shows examples of the light emitting regions A1 and A2 formed when the low beam light sources 32 forming the low beam optical systems 30a and 30b and the ADB light sources 42a to 42d forming the ADB optical system 40a are simultaneously turned on. Although not shown, a light emitting region similar to the light emitting regions A1 and A2 illustrated in FIG. 11A is formed even when the low beam light sources 32 forming the low beam optical systems 30c to 30h and the ADB light sources 42a to 42d forming the ADB optical systems 40b to 40c are simultaneously turned on. With this configuration, the front lens body 20 can be visually recognized as if the entire front lens body 20 is emitting light.

Figure 11B:
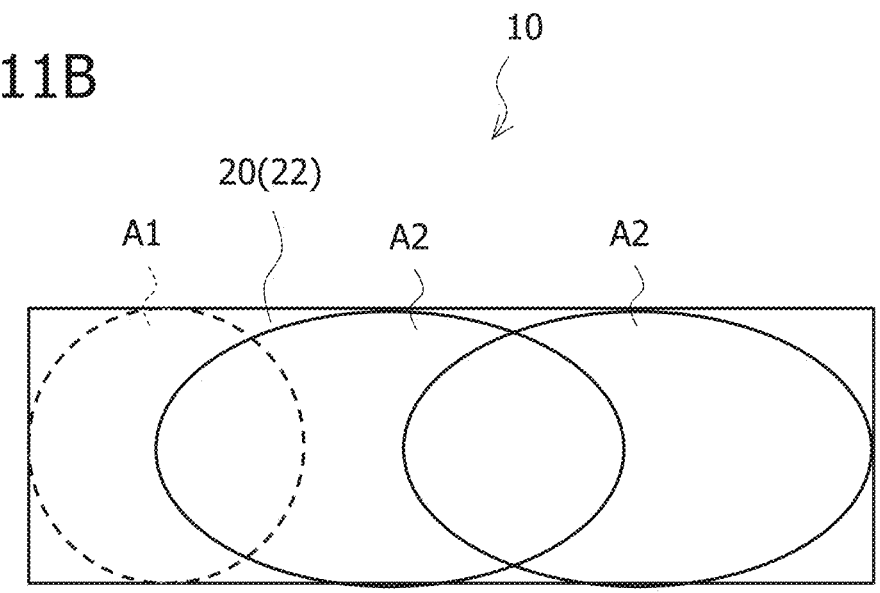

On the other hand, when the low beam light sources 32 are turned on and the ADB light sources 42a to 42d are turned off, as illustrated in FIG. 11B, the light emitting region A2 is formed without the light emitting region A1 being formed.

However, as illustrated in FIG. 11B, because the second light emitting region A2 at least partially overlaps with the first light emitting region A1, the user visually recognizes the region as if the first light emitting region A1 is emitting light. In other words, the front lens body 20 is visually recognized as if the entire front lens body 20 is emitting light, even though the ADB light sources 42a to 42d are turned off.

The width of the portion at which the first light emitting region A1 and the second light emitting region A2 overlap is preferably ⅓ or more the width of the first light emitting region A1. In addition, the width of the area in which only the second light emitting region A2 emits light is preferably ⅘ or more the width when both the first light emitting region A1 and the second light emitting region A2 are emitting light.

As illustrated in FIG. 10, when the front lens body 20 is disposed while being inclined by the receding angle θ1 with respect to the reference axis AX1 extending in the vehicle width direction when viewed from above, the ADB optical system 40 is preferably disposed in front of and adjacent to the low beam optical system 30. The reason for this is described below.

Figure 12:
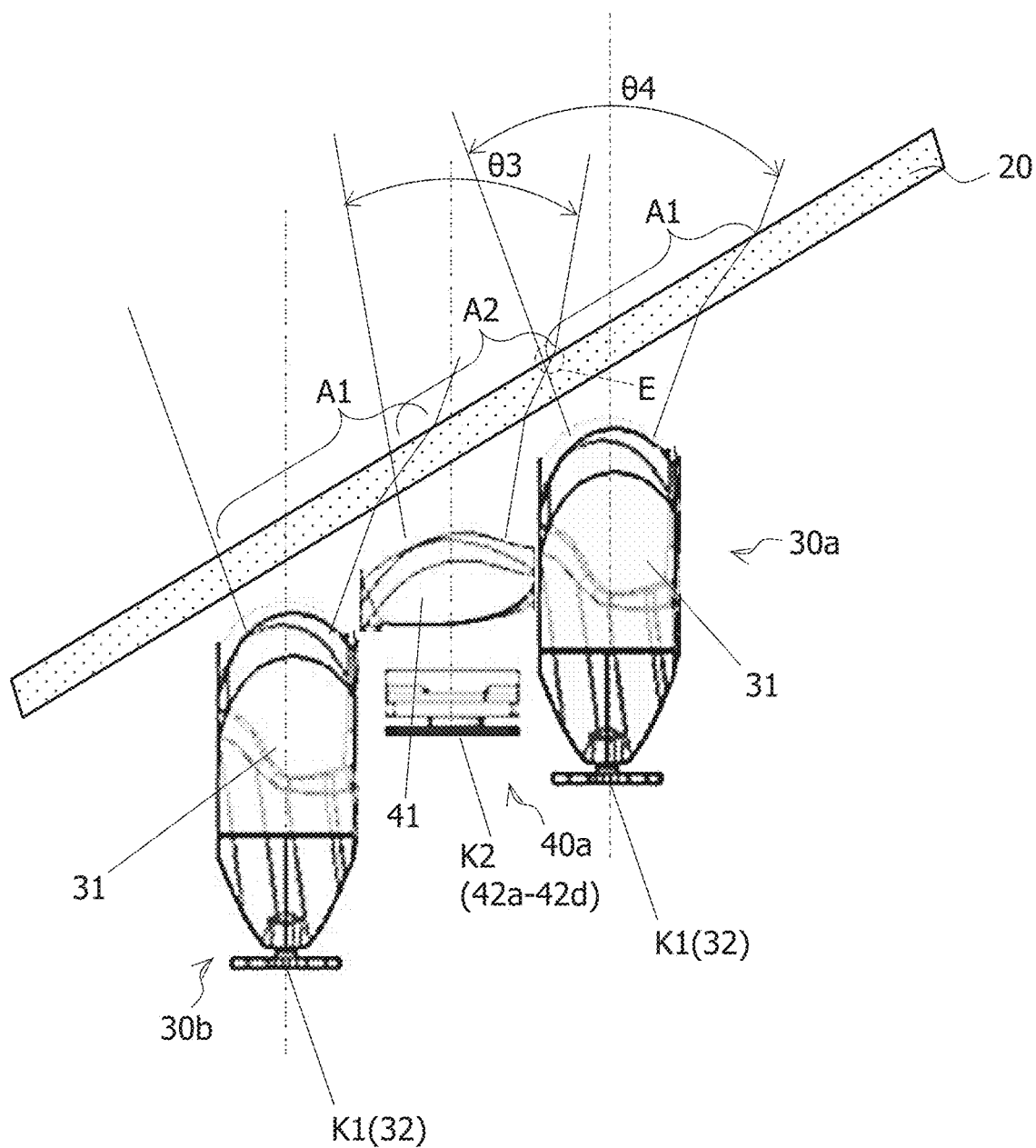
FIG. 12 shows examples of the light emitting regions A1 and A2 formed in the front lens body 20 when the ADB optical system 40 is disposed behind the low beam optical system 30.

First, as illustrated in FIG. 12, when the ADB optical system 40 is disposed behind the low beam optical system 30, compared to a case where the ADB optical system 40 is disposed in front of the low beam optical system 30 (see FIG. 10), the region E in which the first light emitting region A1 and the second light emitting region A2 overlap becomes narrower. Therefore, the ADB optical system 40 is preferably disposed in front of the low beam optical system 30 in terms of expanding the region E in which the first light emitting region A1 and the second light emitting region A2 overlap. FIG. 12 shows examples of the light emitting regions A1 and A2 formed in the front lens body 20 when the ADB optical system 40 is disposed behind the low beam optical system 30.

Figure 13:
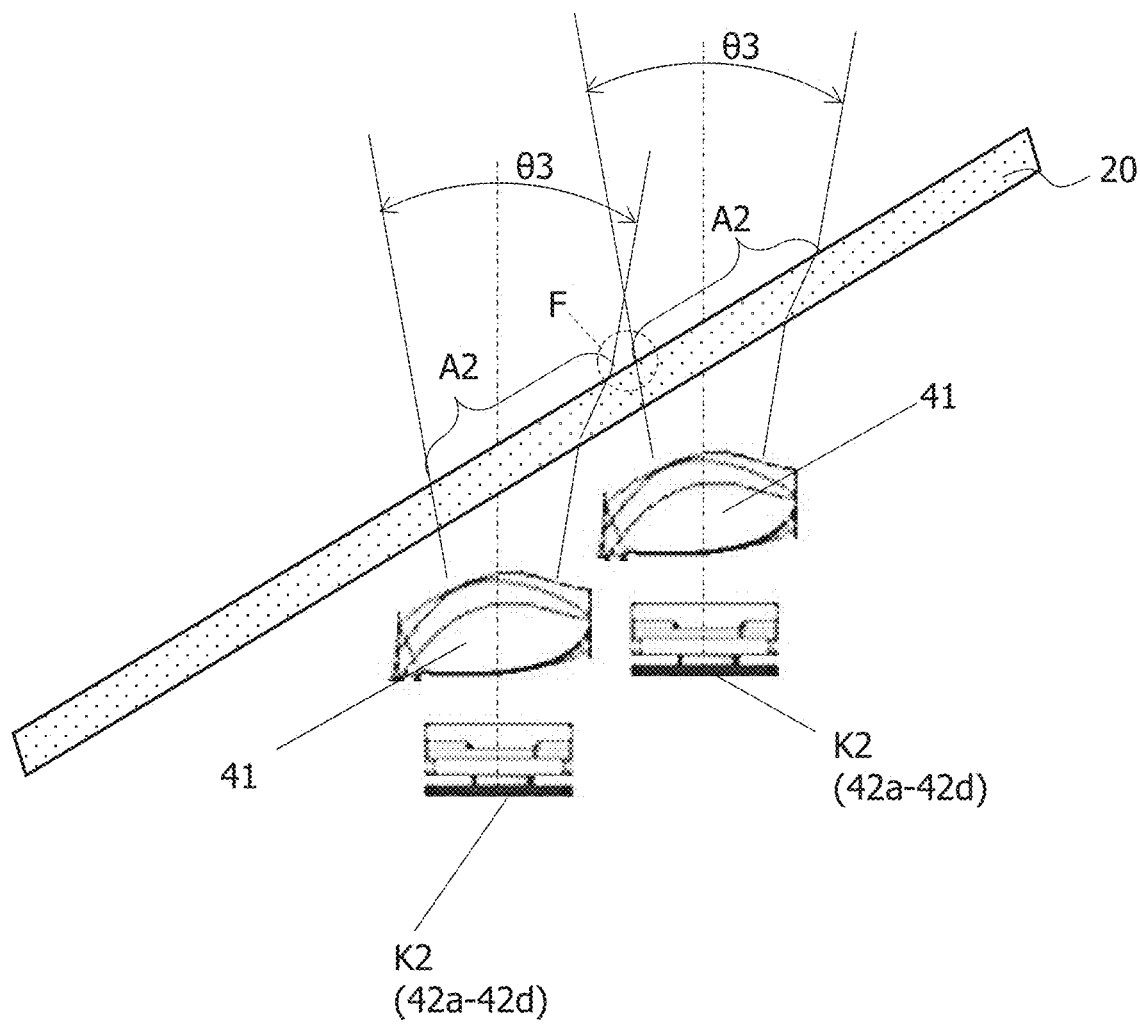
FIG. 13 shows an example of the light emitting region A2 formed in the front lens body 20 when ADB optical systems 40 are disposed adjacent to each other.

As illustrated in FIG. 13, when a plurality of the ADB optical systems 40 are arranged adjacent to each other, the first diffusion angle θ3 is smaller than the second diffusion angle θ4, and hence a non-light emitting region F is formed between the light one emitting region A2 and the other light emitting region A2. Therefore, in order to prevent a non-light emitting region from being generated between two light emitting regions, the ADB optical system 40 is preferably disposed adjacent to the low beam optical system 30. FIG. 13 shows an example of the light emitting region A2 formed in the front lens body 20 when ADB optical systems 40 are disposed adjacent to each other.

As a result, as illustrated in FIG. 10, the ADB optical system 40 is preferably disposed in front of and adjacent to the low beam optical system 30.

As illustrated in FIG. 2, the plurality of ADB optical systems 40a to 40c are preferably disposed in a dispersed manner instead of being disposed adjacent to each other (see FIG. 13). In addition, the low beam optical systems 30a to 30h are preferably disposed between the dispersed ADB optical systems 40 and other ADB optical systems 40. One low beam optical system 30 or a plurality of low beam optical systems 30 may be disposed between the dispersed ADB optical systems 40 and other ADB optical systems 40.

As illustrated in FIG. 2, among the plurality of low beam rear lens units 31 forming each of the low beam optical systems 30a to 30h and the plurality of ADB rear lens units 41 forming each of the ADB optical systems 40a to 40c, the low beam rear lens units 31 and the ADB rear lens units 41 disposed adjacent to each other are formed by injection molding a transparent resin such as acrylic or polycarbonate to form rear lens bodies L1 to L3.

For example, the rear lens body L1 is formed by integrally molding two low beam rear lens units 31 forming the low beam optical systems 30a and 30b and one ADB rear lens unit 41 forming the ADB optical system 40a.

The rear lens body L2 is formed by integrally molding three low beam rear lens units 31 forming the low beam optical systems 30c to 30e and one ADB rear lens unit 41 forming the ADB optical system 40b.

The rear lens body L3 is formed by integrally molding three low beam rear lens units 31 forming the low beam optical systems 30f to 30h and one ADB rear lens unit 41 forming the ADB optical system 40c.

As illustrated in FIG. 2, the rear lens bodies L1 to L3 are disposed along a predetermined direction with intervals S3 therebetween behind the front lens body 20.

Figure 6A:
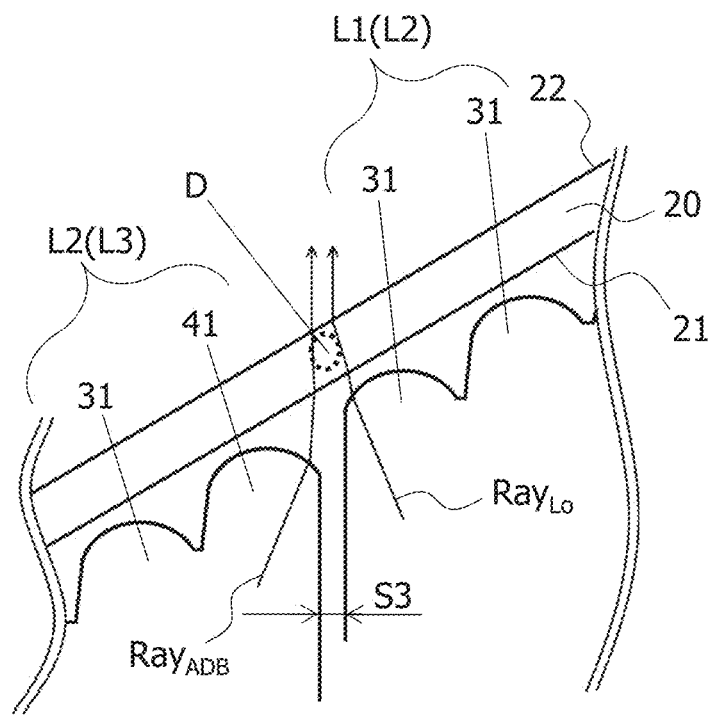
FIG. 6A is a diagram for illustrating a state where a dark portion D at which light from the low beam rear lens unit 31 and the ADB rear lens unit 41 does not pass through a portion of the front lens body 20 corresponding to the interval S3 is generated.

FIG. 6A is a diagram for illustrating a state where a dark portion D at which light from the low beam rear lens unit 31 and the ADB rear lens unit 41 does not pass through a portion of the front lens body 20 corresponding to the interval S3 is generated.

As illustrated in FIG. 6A, when the low beam light sources 32 and the ADB light sources 42a to 42d are simultaneously turned on, the dark portion D is generated according to the size of the interval S3. The dark portion D is generated because the light $Ray_{Lo}$ from the low beam rear lens unit 31 and the light $Ray_{ADB}$ from the ADB rear lens unit 41 do not pass through the portion of the front lens body 20 corresponding to the space S3. As a result, there is a problem that the light emitting region divided by the dark portion D is formed in the front lens body 20, that is, an even light emission feeling of the front lens body 20 can not be achieved.

Figure 6B:
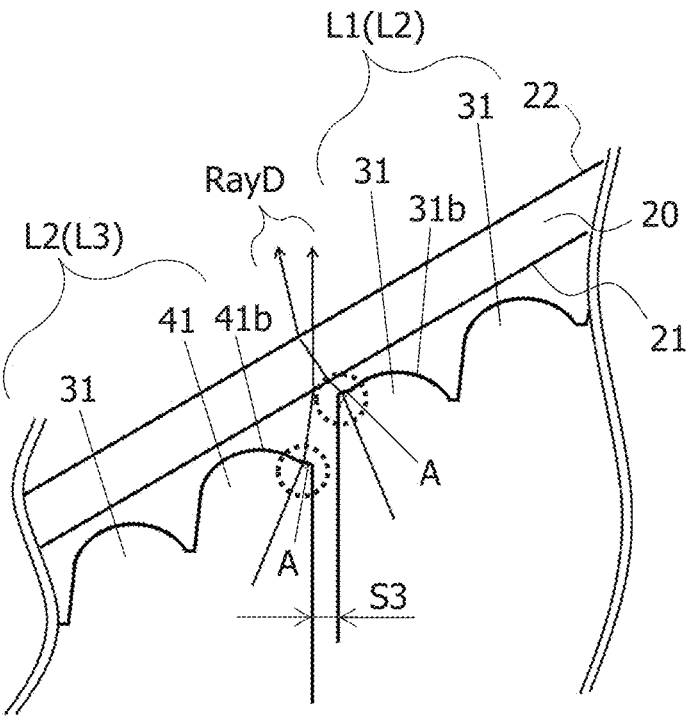
FIG. 6B is a diagram for illustrating a state where the dark portion D has been eliminated.

FIG. 6B is a diagram for illustrating a state where the dark portion D has been eliminated.

In this embodiment, in order to prevent the dark portion D from being generated in the front lens body 20, the low beam rear lens unit 31 and the ADB rear lens unit 41 arranged adjacent to the interval S3 each include a light exiting region A. From the light exiting region A, as illustrated in FIG. 6B, horizontal diffused light RayD which passes through the portion (dark portion D) of the front lens body 20 corresponding to the interval S3 exits. Note that the light exiting region A may be provided in both or one of the low beam rear lens unit 31 and the ADB rear lens unit 41 disposed adjacent to the interval S3.

The light exiting region A is formed by, for example, adjusting the curvature of a partial region in the light exiting portion 31b of the low beam rear lens unit 31 or a partial region in the light exiting surface 41b of the ADB rear lens unit 41b disposed adjacent to the interval S3 (for example, making the curvature of the partial region smaller than the curvature of other regions).

FIG. 7 is an example of a positioning mechanism.

The front lens body 20 and the rear lens bodies L1 to L3 each include a positioning mechanism which determines the relative positional relationship between these two components.

Figure 7A:
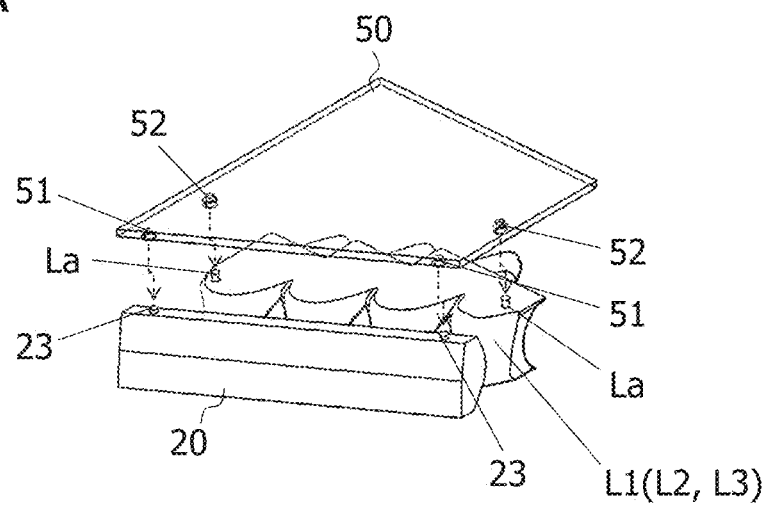
FIGS. 7A and 7B are examples of a positioning mechanism.
Figure 7B:
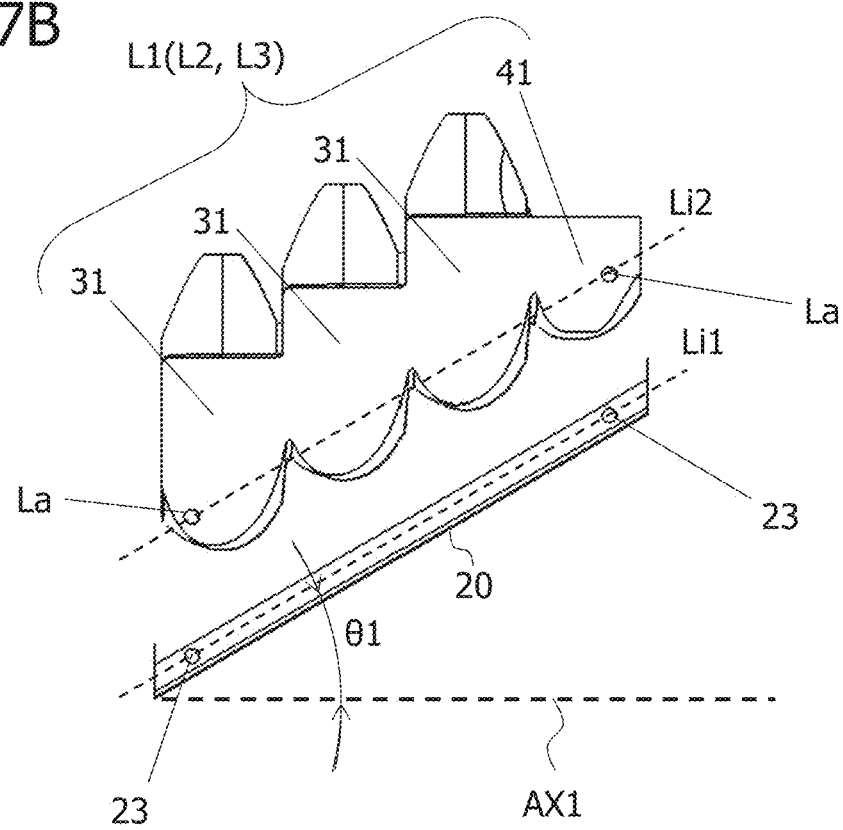

As illustrated in FIG. 7A, the front lens body 20 includes, as the positioning mechanism, a protrusion 23 which is inserted into a recess 51 provided in a structure 50 such as a housing to which the front lens body 20 is attached. As illustrated in FIG. 7B, protrusions 23 are disposed along a straight line Li1 inclined by the receding angle θ1 with respect to the reference axis AX1 extending in the vehicle width direction when viewed from above (two places in FIG. 7B). When viewed from the front, the straight line Li1 extends in a direction inclined by the splice angle θ2 with respect to the reference axis AX1 extending in the vehicle width direction.

The rear lens bodies L1 to L3 each include, as the positioning mechanism, a protrusion La which is inserted into a recess 52 provided in the structure 50 such as a housing to which the rear lens bodies L1 to L3 are attached. As illustrated in FIG. 7B, protrusions La are disposed along a straight line Li2 inclined by the receding angle θ1 with respect to the reference axis AX1 extending in the vehicle width direction (two places in FIG. 7B). When viewed from the front, the straight line Li2 extends in a direction inclined by the splice angle θ2 with respect to the reference axis AX1 extending in the vehicle width direction.

Figure 8:
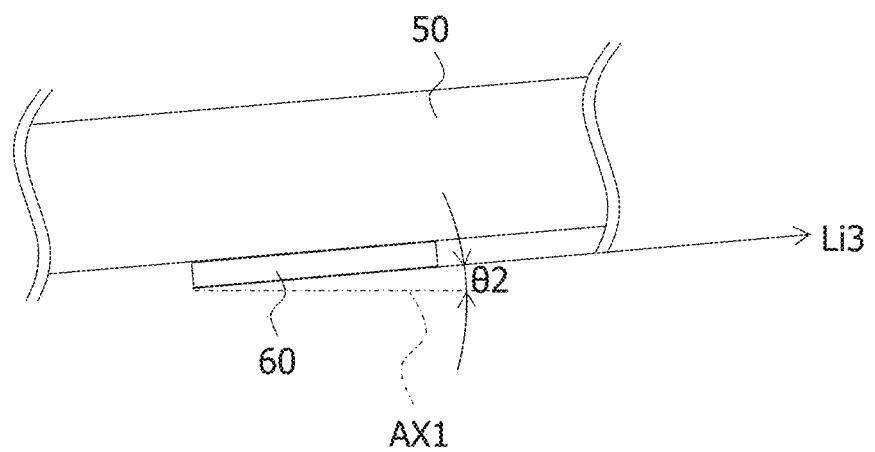
FIG. 8 is an example of an abutting surface 60 configured to support the structure 50.

FIG. 8 is an example of an abutting surface 60 which supports the structure 50.

As illustrated in FIG. 8, the abutting surface 60 which supports the structure 50 is provided parallel to a straight line Li3 inclined by the splice angle θ2 with respect to the reference axis AX1 extending in the vehicle width direction when viewed from the front.

Next, a control means 1 which individually controls lighting states of the low beam light sources 32 of each of the low beam optical systems 30a to 30h and the ADB light sources 42a to 42d of each of the ADB optical systems 40a to 40c is described.

Figure 14:
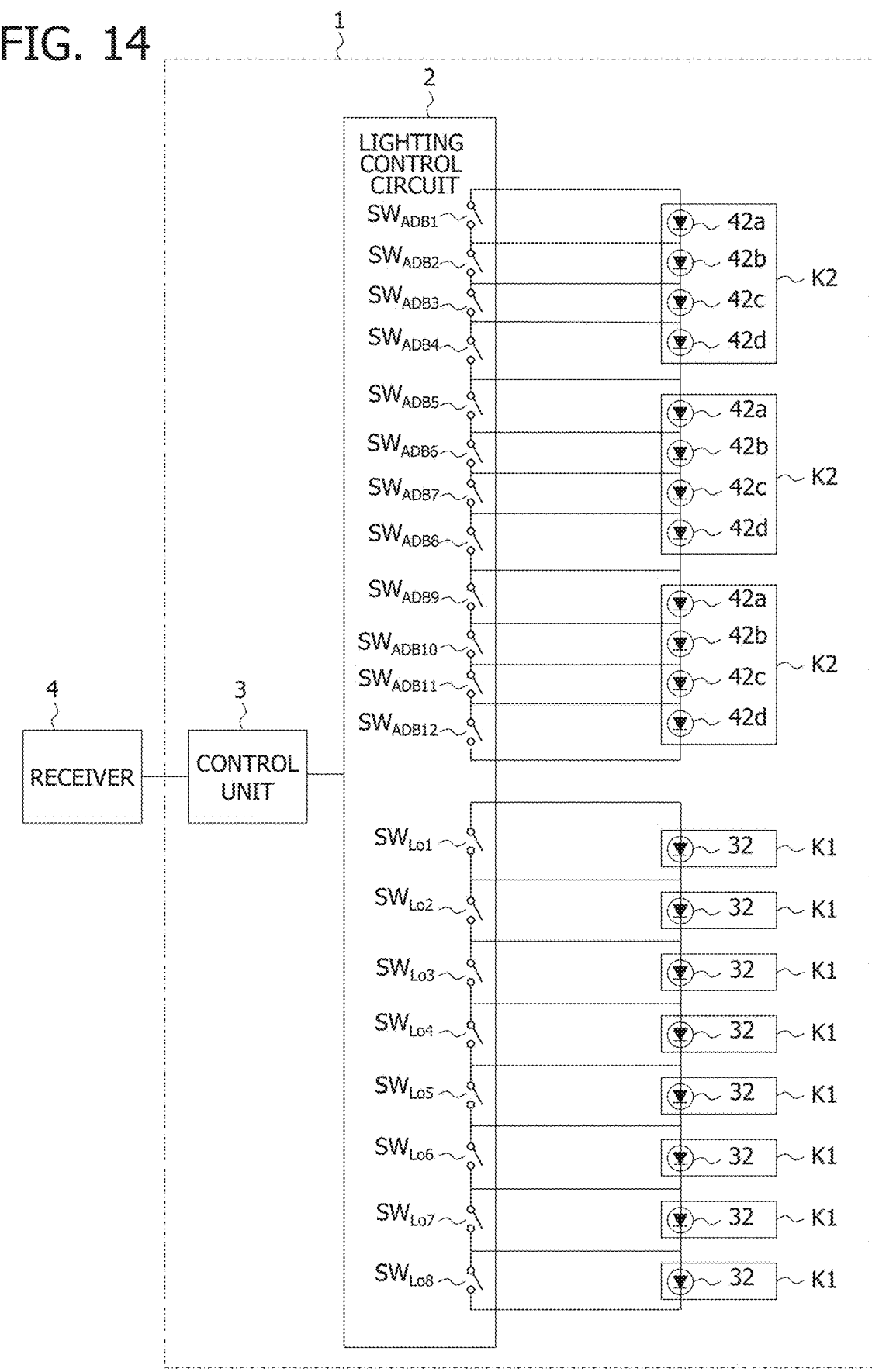
FIG. 14 is an example of the control means 1.

FIG. 14 is an example of the control means 1.

As illustrated in FIG. 14, the control means 1 is configured of, for example, a lighting control circuit 2 and a control unit 3 such as an Electronic Control Unit (ECU).

The low beam light sources 32 of each of the low beam optical systems 30a to 30h are connected to each other in series. A drive voltage is applied to both ends of the low beam light sources 32 connected in series. In addition, switching elements $SW_{Lo1}$ to $SW_{Lo8}$ such as bipolar transistors are connected in parallel to each of the low beam light sources 32. The switching elements $SW_{Lo1}$ to $SW_{Lo8}$ are included in, for example, the lighting control circuit 2. The switching elements $SW_{Lo1}$ to $SW_{Lo8}$ all have the same configuration. Herein, the switching elements $SW_{Lo1}$ to $SW_{Lo8}$ are collectively referred to as "switching elements $SW_{Lo}$" when the switching elements $SW_{Lo1}$ to $SW_{Lo8}$ do not need to be distinguished from each other.

The switching elements $SW_{Lo}$ are turned on/off using a D1 duty cycle PWM (Pulse Width Modulation) signal. The PWM signal is supplied from the control unit 3. When the switching elements $SW_{Lo}$ are turned on, the low beam light sources 32 connected in parallel to the switching elements $SW_{Lo}$ turn off. On the other hand, when the switching elements $SW_{Lo}$ are turned off, the low beam light sources 32 connected in parallel to the switching elements $SW_{Lo}$ turn on.

Similarly, the ADB light sources 42a to 42d of each of the ADB optical systems 40a to 40c are connected to each other in series. A drive voltage is applied to either end of the ADB light sources 42a to 42d connected in series. In addition, switching elements $SW_{ADB1}$ to $SW_{ADB12}$ such as bipolar transistors are connected in parallel to each of the ADB light sources 42a to 42d. The switching elements $SW_{ADB1}$ to $SW_{ADB12}$ are included in, for example, the lighting control circuit 2. The switching elements $SW_{ADB1}$ to $SW_{ADB12}$ all have the same configuration. Herein, the switching elements $SW_{ADB1}$ to $SW_{ADB12}$ are collectively referred to as "switching elements $SW_{ADB}$" when the switching elements $SW_{ADB1}$ to $SW_{ADB12}$ do not need to be distinguished from each other.

The switching elements $SW_{ADB}$ are turned on/off using the D1 duty cycle PWM signal. The PWM signal is supplied from the control unit 3. When the switching elements $SW_{ADB}$ are turned on, the ADB light sources 42a to 42d connected in parallel to the switching elements $SW_{ADB}$ turn off. On the other hand, when the switching elements $SW_{ADB}$ are turned off, the ADB light sources 42a to 42d connected in parallel to the switching elements $SW_{ADB}$ turn on.

Because the low beam light sources 32 and the ADB light sources 42a to 42d are connected to each other as described above, the control unit 3 can individually control the lighting states of the low beam light sources 32 and the ADB light sources 42a to 42d by applying the D1 duty cycle PWM signal to the switching elements $SW_{Lo}$ and $SW_{ADB}$.

A receiver 4 is connected to the control unit 3. The receiver 4 receives a locking signal for locking a vehicle door or an unlocking signal for unlocking the vehicle door. These signals are transmitted using a car key carried by the user, for example, a driver.

When the low beam light distribution pattern is to be formed, the control unit 3 controls the lighting states of the low beam light sources 32 of each of the low beam optical systems 30a to 30h at a first power. Similarly, when a high beam light distribution pattern is to be formed, the control unit 3 controls the lighting states of the low beam light sources 32 of each of the low beam optical systems 30a to 30h and the ADB light sources 42a to 42d of each of the ADB optical systems 40a to 40h at the first power.

If a predetermined state is detected, for example, if reception of the locking signal for locking the vehicle door or the unlocking signal for unlocking the vehicle door is detected (or if the vehicle door has actually been locked or unlocked on the basis of receiving the locking signal for locking the vehicle door or the unlocking signal for unlocking the vehicle door), the control unit 3 individually controls the lighting states of low beam light sources 32 of each of the low beam optical systems 30a to 30h and the ADB light sources 42a to 42d of each of the ADB optical systems 40a to 40h at a second power lower than the first power. The control unit 3 corresponds to a detection means according to the present invention.

Next, an example of control by the control means 1 is described.

Figure 15:
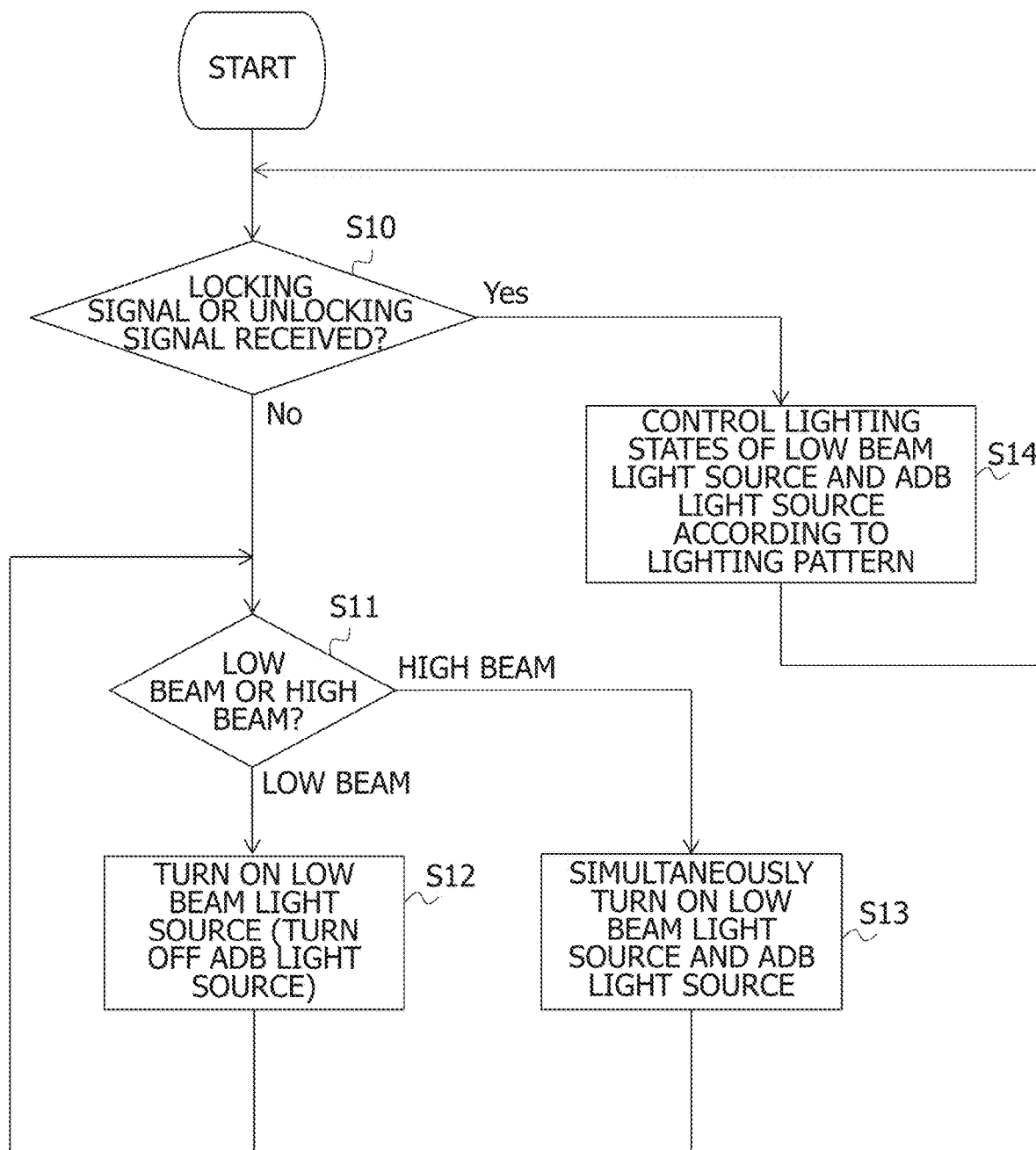
FIG. 15 is a flow chart for explaining an example of control by the control means 1.
Figure 16:
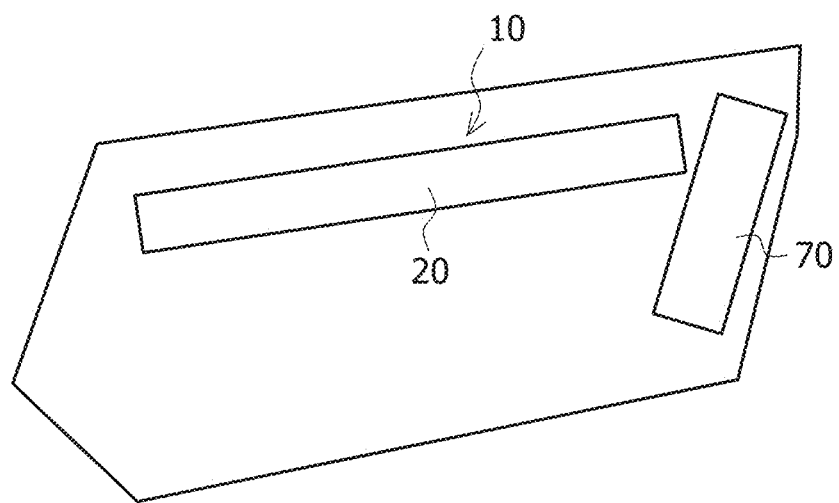
FIG. 16 is a diagram (front view) for explaining a modification example of the vehicular lamp 10.

FIG. 15 is a flow chart for explaining an example of control by the control means 1.

The following processing is executed by, for example, running a control program that a CPU in the control means 1 (control unit 3) reads from a ROM to a RAM (neither shown).

First, the control unit 3 determines whether or not the receiver 4 has received the locking signal or the unlocking signal transmitted from the car key carried by the user (Step S10).

If the result of this determination indicates that no locking signal or unlocking signal has been received (Step S10: No), the control unit 3 determines if a headlamp switch (not shown) in the vehicle has been switched to a low beam setting or a high beam setting (Step S11).

If the result of this determination indicates that the headlamp switch has been switched to the low beam setting (Step S11: Low beam), the control unit 3 turns on the low beam light sources 32 and turns off the ADB light sources 42a to 42d (Step S12). For example, the control unit 3 applies a 100% duty cycle PWM signal to each of the switching elements $SW_{Lo1}$ to $SW_{Lo8}$ and supplies each of the low beam light sources 32 with the first power to simultaneously turn on the low beam light sources 32. In addition, the control unit 3 applies a 0% duty cycle PWM signal to each of the switching elements $SW_{ADB1}$ to $SW_{ADB12}$ and does not supply the ADB light sources 42a to 42d with power, to thereby turn off the ADB light sources 42a to 42d.

As a result, the low beam light distribution pattern $P_{Lo}$ (see FIG. 9A) is formed.

On the other hand, if the result of the determination in S11 indicates that the headlamp switch has been switched to the high beam setting (Step S11: High beam), the control unit 3 simultaneously turns on the low beam light sources 32 and the ADB light sources 42a to 42d (Step S13). For example, the control unit 3 applies a 100% duty cycle PWM signal to each of the switching elements $SW_{Lo1}$ to $SW_{Lo8}$ and supplies each of the low beam light sources 32 with the first power W1 to turn on the low beam light sources 32. In addition, the control unit 3 applies a 25% duty cycle PWM signal to each of the switching elements $SW_{ADB1}$ to $SW_{ADB12}$ and supplies the ADB light sources 42a to 42d with power equivalent to ¼ of the first power W1 to turn on the ADB light sources 42a to 42d. With this configuration, the ADB light sources 42a to 42d can be turned on at the same brightness as the low beam light sources 32. Note that the "4" in the expression "¼ of the first power W1" indicates the number of ADB light sources 42a to 42d and corresponds to "N" according to the present invention.

As a result, the high beam light distribution pattern $P_{Hi}$ (see FIG. 9C) which is a combination of the low beam light distribution pattern $P_{Lo}$ and the ADB light distribution pattern $P_{ADB}$ is formed.

Alternatively, if the result of the determination in S10 indicates that a locking signal or an unlocking signal has been received (Step S10: Yes), the control unit 3 individually controls the lighting states of the low beam light sources 32 and the ADB light sources 42a to 42d according to a preset lighting pattern (Step S14).

The preset lighting pattern is, for example, a sequential lighting pattern such as that described below.

As illustrated in FIG. 1, when the low beam optical systems 30a to 30h and the ADB optical systems 40a to 40c are disposed, all the light sources 32 and 42a to 42d of the low beam optical systems 30a to 30h and the ADB optical systems 40a to 40c are first turned off. Then, only the ADB light sources 42a to 42d of the ADB optical system 40a are simultaneously turned on. Next, the ADB light sources 42a to 42d of the ADB optical system 40a are turned off and only the low beam light source 32 of the low beam optical system 30a is turned on. Then, the low beam light source 32 of the low beam optical system 30a is turned off and only the low beam light source 32 of the low beam optical system 30b is turned on. Through repeating a similar on/off pattern, there can be achieved a sequential lighting pattern which is visually recognized as if the lit portion moves from left to right in FIG. 1.

By viewing this lighting pattern, the user can grasp that the vehicle door has been locked or unlocked.

As described above, through individually controlling the lighting states of the light sources 32 and 42a to 42d of the low beam optical systems 30a to 30h and the ADB optical systems 40a to 40c, a reply (notification) can be sent indicating that the vehicle door has been locked or unlocked.

Note that if the low beam light sources 32 are to be turned on in S14, the control unit 3 preferably applies, for example, a 50% duty cycle PWM signal to the switching elements $SW_{Lo}$ and supplies the low beam light sources 32 with the second power W2 which is lower than the first power W1, to thereby turn on the low beam light sources 32 (in other words, turn on the low beam light sources 32 at a brightness lower than that when forming the low beam light distribution pattern). In addition, if the ADB light sources 42a to 42d are to be turned on in S14, the control unit 3 preferably applies, for example, a 12.5% duty cycle PWM signal to the switching elements $SW_{ADB}$ and supplies the ADB light sources 42a to 42d with a power that is ¼ of the second power W2, to thereby turn on the ADB light sources 42a to 42d (in other words, turn on the ADB light sources 42a to 42d at a brightness lower than that when forming the ADB light distribution pattern).

Next, an example of setting a light diffusing element (also referred to as a "dimple") in the front lens body 20 is described.

[Case where No Light Diffusing Element is Set in Front Lens Body 20]

Figure 17A:
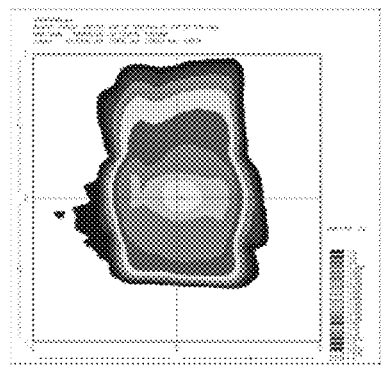
FIGS. 17A-17C are examples of an ADB light distribution pattern $P_{ADB}$.

As illustrated in FIG. 3, if no light diffusing element is set in front lens body 20 extending in the direction inclined by the splice angle θ2 with respect to the reference axis AX1 which extends in the vehicle width direction, the ADB light distribution pattern $P_{ADB}$ illustrated in FIG. 17A is formed on the imaginary vertical screen when, for example, one light source among the ADB light sources 42a to 42d which form the ABD optical system 40a is turned on.

In contrast, in order to improve the feel of light distribution, the inventors of the present invention investigated blurring the ADB light distribution pattern $P_{ADB}$ in the horizontal direction and the vertical direction by setting a light diffusion element in the front lens body 20.

[Case where Light Diffusing Element is Set in Front Lens Body 20]

Figure 18:
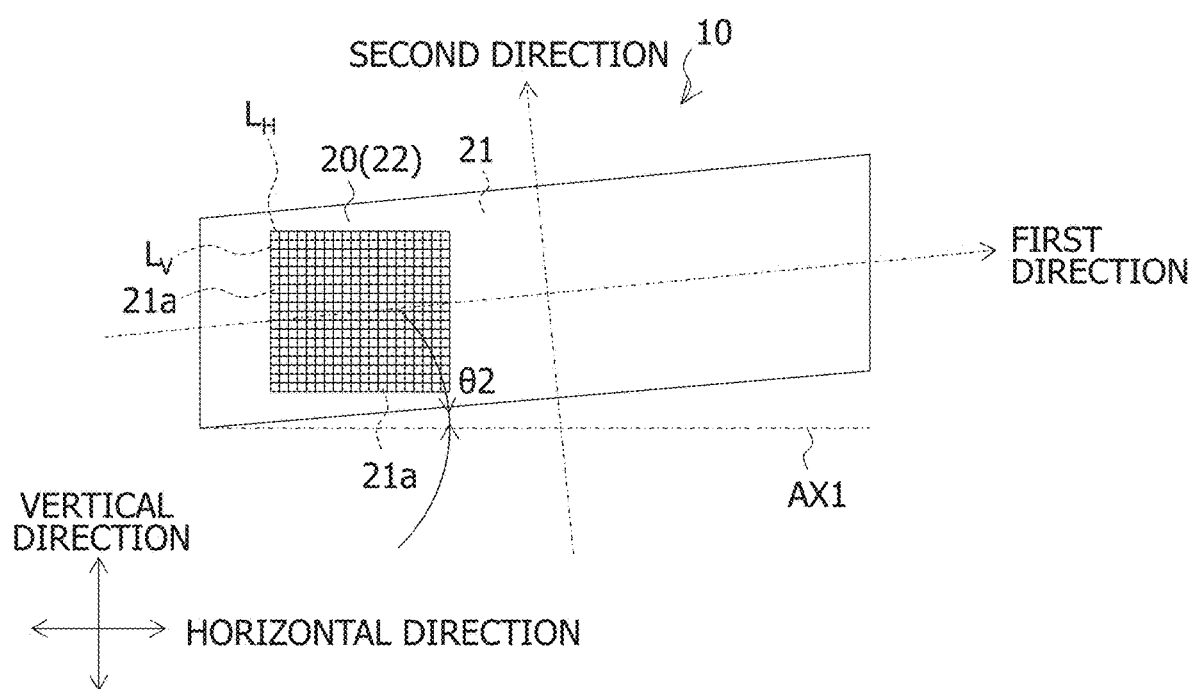
FIG. 18 is an example of a light diffusing element 21a set in the front lens body 20.

FIG. 18 is an example of a light diffusing element 21a set in the front lens body 20.

As illustrated in FIG. 18, the inventors of the present invention divided a region of the front lens body 20 (for example, a partial region of the light incident surface 21) permeated by light from the ADB optical system 40 into a plurality of rectangular regions using a plurality of horizontal straight lines $L_H$ and a plurality of vertical straight lines $L_V$. One light diffusing element 21a was set in each of the plurality of rectangular regions. The light diffusing element 21a is a light diffusing element (for example, a convex lens which protrudes toward the rear of the vehicle) which diffuses the light from the ADB optical system 40 in horizontal and vertical directions.

Figure 17B:
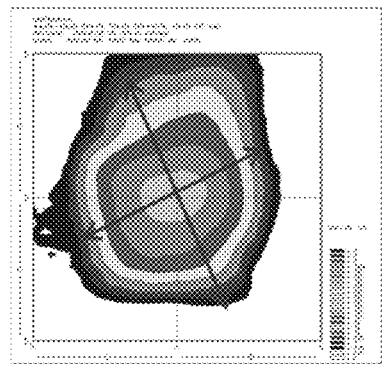

The inventors of the present invention conducted a simulation and found that, when the light diffusing element 21a is disposed as illustrated in FIG. 18, the ADB light distribution pattern $P_{ADB}$ does not blur in the horizontal and vertical directions and instead, as illustrated in FIG. 17B, blurs in directions inclined relative to the horizontal and vertical directions (see the arrows in FIG. 17B).

As a result, the inventors of the present invention eagerly studied how to blur the ADB light distribution pattern $P_{ADB}$ in the horizontal direction and the vertical direction.

Figure 19:
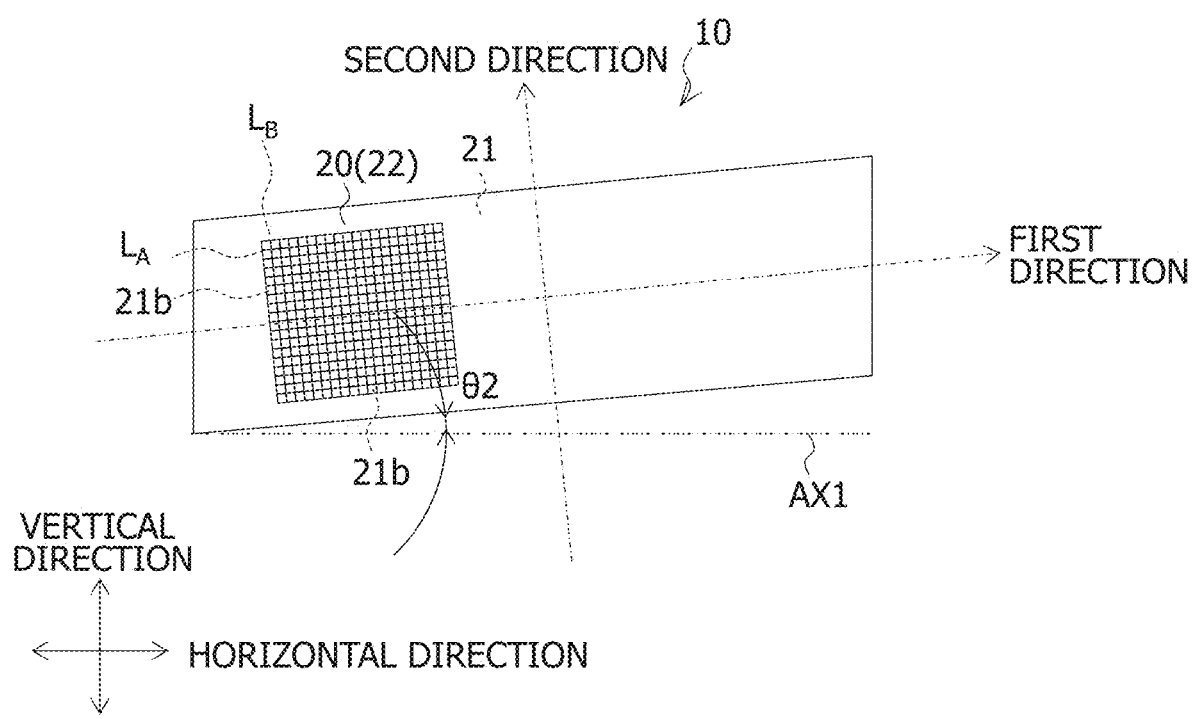
FIG. 19 is an example of a light diffusing element 21b set in the front lens body 20.

FIG. 19 is an example of a light diffusing element 21b set in the front lens body 20.

Figure 17C:
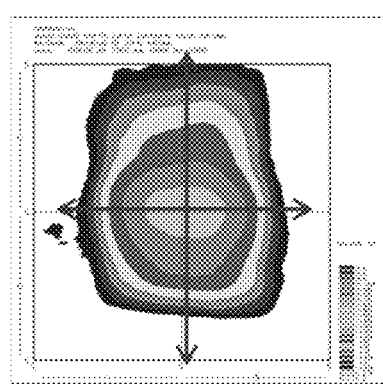

As a result, the inventors of the present invention found that, as illustrated in FIG. 19, the ADB light distribution pattern $P_{ADB}$ can be blurred in the horizontal and vertical directions (see the arrows in FIG. 17C) as illustrated in FIG. 17C by dividing a region of the front lens body 20 (for example, a partial region of the light incident surface 21 or the light exiting surface 22) permeated by light from the ADB optical system 40 into a plurality of rectangular regions with a plurality of straight lines $L_A$ extending in the first direction (direction inclined by the splice angle θ2 with respect to the reference axis AX1) and a plurality of straight lines $L_B$ extending in the second direction orthogonal to the first direction, and setting one light diffusing element 21b in each rectangular region. The light diffusing element 21b is a light diffusing element (for example, a convex lens which protrudes toward the rear of the vehicle) which diffuses the light from the ADB optical system 40 in the first and second directions.

The cross-sectional shape of the light diffusing element 21b (rectangular region) when cut along a plane orthogonal to the first direction and a plane orthogonal to the second direction is a continuous curved shape. For example, the cross-sectional shape of the light diffusing element 21b (rectangular region) is a curved shape (for example, a convex curved shape protruding toward the rear of the vehicle) slightly expanded toward the center from either end of the cross-sectional shape, or a curved shape (for example, a concave curved shape recessed toward the rear of the vehicle) slightly recessed toward the center from either end of the cross-sectional shape.

Figure 20:
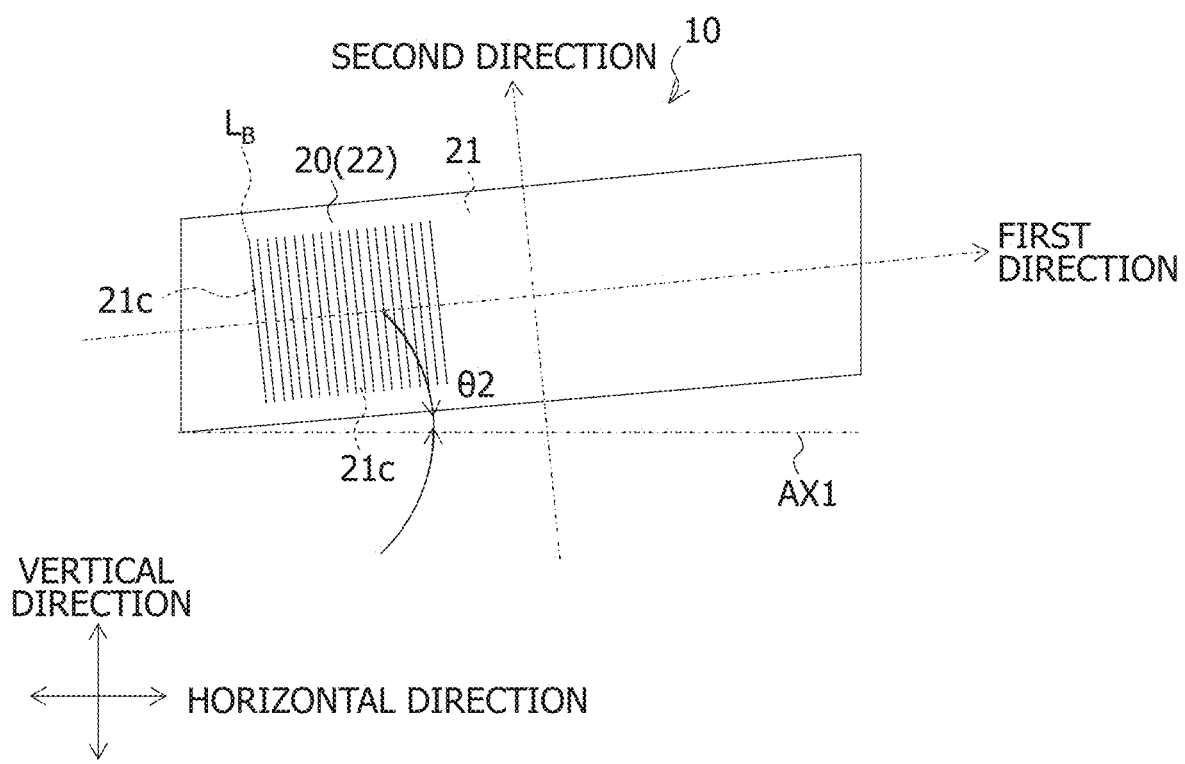
FIG. 20 is an example of a light diffusing element 21c set in the front lens body 20.

FIG. 20 is an example of a light diffusing element 21c set in the front lens body 20.

Further, as illustrated in FIG. 20, the inventors of the present invention found that vertical edges (see the vertical edges e1 and e4 in FIG. 9B) of the ADB light distribution pattern $P_{ADB}$ can be blurred in the horizontal direction by dividing a region of the front lens body 20 (for example, a partial region of the light incident surface 21 or the light exiting surface 22) permeated by light from the ADB optical system 40 into a plurality of long and thin regions with the plurality of straight lines $L_B$ extending in the second direction orthogonal to the first direction and setting one light diffusing element 21c in each long and thin region. The light diffusing element 21c is a light diffusing element (for example, a cylindrical surface extending in the second direction) which diffuses the light from the ADB optical system 40 in the first direction.

The cross-sectional shape of the light diffusing element 21c (long and thin region) when cut along a plane orthogonal to the second direction is a continuous curved shape. For example, the cross-sectional shape of the light diffusing element 21c (long and thin region) is a curved shape (for example, a convex curved shape protruding toward the rear of the vehicle) slightly expanded toward the center from either end of the cross-sectional shape or a curved shape (for example, a concave curved shape recessed toward the rear of the vehicle) slightly recessed toward the center from either end of the cross-sectional shape.

Figure 21:
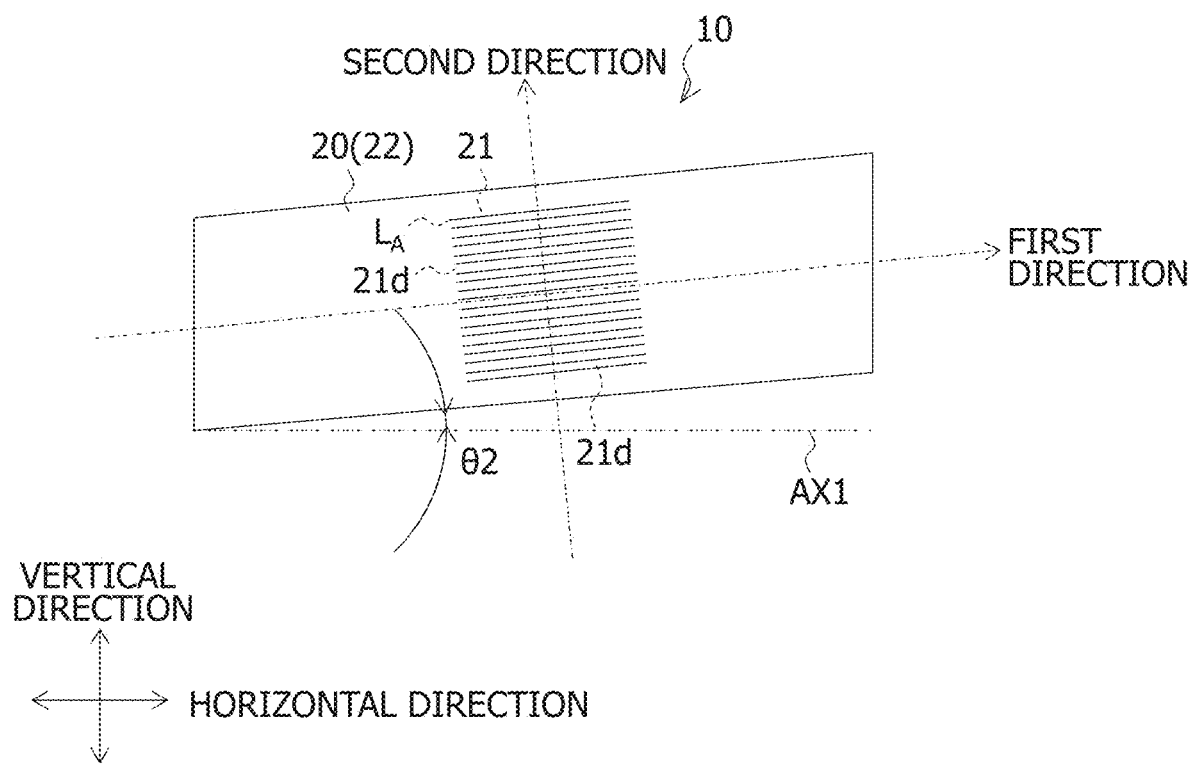
FIG. 21 is an example of a light diffusing element 21d set in the front lens body 20.

FIG. 21 is an example of a light diffusing element 21d set in the front lens body 20.

Further, as illustrated in FIG. 21, the inventors of the present invention found that the cutoff line CL (see FIG. 9A) of the low beam light distribution pattern $P_{Lo}$ can be blurred in the vertical direction by dividing a region of the front lens body 20 (for example, a partial region of the light incident surface 21 or the light exiting surface 22) permeated by light from the low beam optical system 30 into a plurality of long and thin regions with the plurality of straight lines $L_A$ extending in the first direction and setting one light diffusing element 21d in each long and thin region. The light diffusing element 21d is a light diffusing element (for example, a cylindrical surface extending in the first direction) which diffuses the light from the low beam optical system 30 in the second direction.

The cross-sectional shape of the light diffusing element 21d (long and thin region) when cut along a plane orthogonal to the first direction is a continuous curved shape. For example, the cross-sectional shape of the light diffusing element 21d (long and thin region) is a curved shape (for example, a convex curved shape protruding toward the rear of the vehicle) slightly expanded toward the center from either end of the cross-sectional shape or a curved shape (for example, a concave curved shape recessed toward the rear of the vehicle) slight recessed toward the center from either end of the cross-sectional shape.

As described above, according to this embodiment, there can be provided a vehicular lamp 10 in which a light emitting region does not change (or hardly changes) both when the ADB light sources 42a to 42d (or high beam light sources to be described later) are turned off and the low beam light sources 32 are turned on, and when both the ADB light sources 42a to 42d (or high beam light sources to be described later) and the low beam light sources 32 are simultaneously turned on.

This is because, when the ADB light sources 42a to 42d (or high beam light sources to be described later) are turned off and the low beam light sources 32 are turned on, the second light emitting region A2 which at least partially overlaps with the first light emitting region A1 is formed in the front lens body 20 by horizontally diffusing the light from the low beam light sources 32, which permeates the low beam rear lens unit 31 and the front lens body 20 in that order, at the second diffusion angle θ4 which is larger than the first diffusion angle θ3.

Further, according to this embodiment, there can be provided the vehicle lamp 10 which has a good line-shaped appearance.

This is because, as illustrated in FIG. 2, one front lens body 20 extends in the predetermined direction without being segmented, and a plurality of optical systems (the low beam rear lens unit 31 and the ADB rear lens unit 41) are disposed along the predetermined direction behind the front lens body 20 which extends in the predetermined direction without being segmented.

Further, according to this embodiment, because a plurality of rear lens units (the low beam rear lens unit 31 and the ADB rear lens unit 41) are integrally molded in units of rear lens bodies, such as the rear lens bodies L1 to L3, molding is made easier compared to a case where all of the plurality of rear lens units are molded integrally.

In addition, according to this embodiment, even when, for example, the rear lens body L1 (corresponding to a first rear lens body according to the present invention) and the rear lens body L2 (corresponding to a second rear lens body according to the present invention) are disposed with the interval S3 (see FIG. 6A) therebetween, the dark portion D through which light does not pass can be prevented from being generated at the portion of the front lens body 20 corresponding to the interval S3 (see FIG. 6B).

This is because, as illustrated in FIG. 6B, the rear lens units (low beam rear lens unit 31 and ADB rear lens unit 41) arranged adjacent to the interval S3 include the light exiting region A, and horizontal diffused light which passes through the portion of the front lens body 20 corresponding to the interval S3 exits from the light exiting region A.

In addition, according to this embodiment, the relative positional relationship between the front lens body 20 and the rear lens bodies L1 to L3 can be determined because the front lens body 20 and the rear lens bodies L1 to L3 each include the positioning mechanism which determines the relative positional relationship between these components.

Next, a modification example is described.

In the above-described embodiment, a flat surface (for example, a vertical surface) is used for the light incident surface 21 of the front lens body 20 and a semi-cylindrical surface (cylindrical surface) having a cylindrical axis extending in the first direction is used for the light exiting surface 22 of the front lens body 20, but the present invention is not limited to this example.

For example, a semi-cylindrical surface (cylindrical surface) having a cylindrical axis extending in the first direction may be used for the light incident surface 21 of the front lens body 20 and a flat surface (for example, a vertical surface) may be used for the light exiting surface 22 of the front lens body 20.

Further, in the above-described embodiment, a semi-cylindrical surface (cylindrical surface) having a cylindrical axis extending in the second direction is used for the light exiting portion 31b of the low beam rear lens unit 31, but the present invention is not limited to this example.

For example, a convex lens surface protruding toward the front of the vehicle may be used for the light exiting portion 31b of the low beam rear lens unit 31. The same applies to the light exiting surface 41b of the ADB rear lens unit 41.

Further, in the above-described embodiment, the ADB optical system 40 is used for the first optical system, but the present invention is not limited to this example.

For example, a high beam optical system may be used for the first optical system.

Note that, although not shown, the high beam optical system includes, for example, a high beam rear lens unit disposed behind the front lens body 20 and a high beam light source disposed behind the high beam rear lens unit and emits light which is horizontally irradiated forward at the first diffusion angle θ3 permeating the high beam rear lens unit and the front lens body 20 in that order to form a high beam light distribution pattern.

Figure 9D:
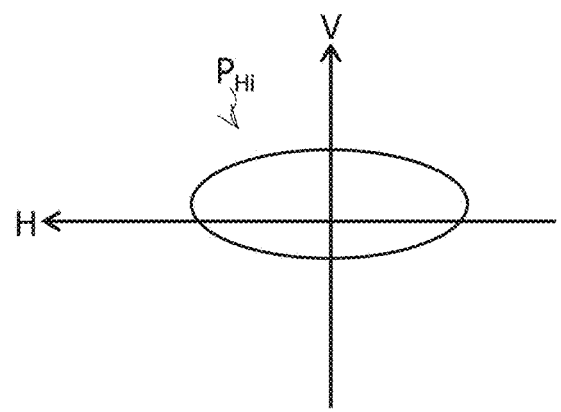
FIG. 9D is an example of the high beam light distribution pattern $P_{Hi}$.

FIG. 9D is an example of the high beam light distribution pattern $P_{Hi}$. FIG. 9D shows an example of the high beam light distribution pattern $P_{Hi}$ formed on the imaginary vertical screen.

Further, in the above-described embodiment, a plurality of rear lens units (the low beam rear lens unit 31 and the ADB rear lens unit 41) are integrally molded in units of rear lens bodies, such as the rear lens bodies L1 to L3, but the present invention is not limited to this example. The plurality of rear lens units (the low beam rear lens unit 31 and the ADB rear lens unit 41) may be molded so as to be physically independent from each other without being molded integrally.

In addition, in the above-described embodiment, the front lens body 20 includes, as a positioning mechanism, the protrusion 23 which is inserted into the recess 51 provided in the structure 50 such a housing, but the present invention is not limited to this example. For example, although not shown, the front lens body 20 may include, as the positioning mechanism, a recess into which a protrusion formed on the structure 50 such as a housing is inserted.

Similarly, in the above-described embodiment, the rear lens bodies L1 to L3 each include, as a positioning mechanism, the protrusion La inserted into the recess 52 provided in the structure 50 such a housing, but the present invention is not limited to this example. For example, although not shown, the rear lens bodies L1 to L3 may each include, as the positioning mechanism, a recess into which a protrusion formed on the structure 50 such as a housing is inserted.

It goes without saying that the numbers in the above-described embodiment are merely examples and other appropriate numbers may be used.

The various aspects of the above-described embodiment are merely exemplary and the description of the embodiment is not intended to limit the scope of the present invention. The present invention may be implemented in numerous other ways without departing from the gist or main technical characteristics of the present invention.

What is claimed is:

1. A vehicular lamp comprising:
   a front lens body extending in a predetermined direction; and
   a first optical system and a second optical system disposed adjacent to each other along the predetermined direction behind the front lens body, wherein
   the first optical system includes:
      a high beam optical system including a high beam rear lens unit disposed behind the front lens body and a high beam light source disposed behind the high beam rear lens unit and emits light which is irradiated forward permeating the high beam rear lens unit and the front lens body in that order to form a high beam light distribution pattern, or
      an ADB optical system including an ADB rear lens unit disposed behind the front lens body and an ADB light source disposed behind the ADB rear lens unit and emits light which is irradiated forward permeating the ADB rear lens unit and the front lens body in that order to form an ADB light distribution pattern,
   the second optical system includes:
      a low beam optical system including a low beam rear lens unit disposed behind the front lens body and a low beam light source disposed behind the low beam rear leas unit and emits light which is irradiated forward permeating the low beam rear lens unit and the front lens body in that order to form a low beam light distribution pattern,
   the front lens body includes:
      a light incident surface extending in the predetermined direction; and
      a light exiting surface extending is the predetermined direction on a side opposite to the light incident surface,
   the light incident surface is a surface at which light from the first and second optical systems enters the front leas body,
   the light exiting surface is a surface at which light from the first and second optical systems which has entered from the light incident surface exits, and
   at least one of the light incident surface and the light exiting surface is a cylindrical surface in which a cylindrical axis extends in the predetermined direction, the light from the high beam or the ADB light source which permeates the high beam or the ADB rear lens unit and the front lens body forms a first light emitting region in the front lens body, the first light emitting region being viewed in the front lens body when the front lens body, is viewed from a light irradiation direction side, and the light from the low beam light source which permeates the low beam rear lens unit and the front lens body forms a second light emitting region which at least partially overlaps with the first light emitting region in the front lens body, the second light emitting region being viewed in the front lens body when the front lens body is viewed from the light irradiation direction side.

2. The vehicular lamp according to claim 1, wherein
a diffusion angle in horizontal direction of the light from the high beam or the ADB light source which permeates the high beam or the ADB rear lens unit and the front lens body is a first diffusion angle,
a diffusion angle in horizontal direction of the light from the low beam light source which permeates the low beam rear lens unit and the front lens body is a second diffusion angle,
the second diffusion angle is larger than the first diffusion angle.

3. The vehicular lamp according to claim 1, wherein
a surface shape of a light exit surface of the high beam or the ADB rear lens unit is adjusted so that the diffusion angle in horizontal direction of the light from the high beam or the ADB light source which permeates the high beam or the ADB rear lens unit and the front lens body becomes the first diffusion angle,
a surface shape of a light exit surface of the low beam rear lens unit is adjusted so that the diffusion angle in horizontal direction of the light from the low beam light source which permeates the low beam rear lens unit and the front lens body becomes the second diffusion angle.

4. The vehicular lamp according to claim 1, wherein
the high beam or the ADB rear lens unit is configured to condense, in a first direction, light from the high beam or the ADB light source which permeates the high beam or the ADB rear lens unit,
the low beam rear lens unit is configured to condense, in the first direction, light from the low begun light source which permeates the low beam rear lens unit,
the front lens body is configured to condense, in a second direction orthogonal to the first direction, light from the high beam or the ADB rear lens unit and the low beam rear lens unit which permeates the front lens body.

5. The vehicular lamp according to claim 1, wherein
the front lens body is disposed while being inclined at a receding angle with respect to a reference axis which extends in a vehicle width direction when viewed from above, and
the first optical system is disposed ahead of the second optical system.

6. The vehicular lamp according to claim 1, wherein
the first optical system includes at least the ADB optical system,
the ADB light source includes a plurality of semiconductor light emitting elements which are mounted on an identical substrate and are able to individually light up.

7. The vehicular lamp according to claim 2, wherein
the first optical system includes at least the ADB optical system,
the ADB light source includes a plurality of semiconductor light emitting elements which are mounted on an identical substrate and are able to individually light up.

8. The vehicular lamp according to claim 3, wherein
the first optical system includes at least the ADB optical system,
the ADB light source includes a plurality of semiconductor light emitting elements which are mounted on an identical substrate and are able to individually light up.

9. The vehicular lamp according to claim 5, wherein
the first optical system includes at least the ADB optical system,
the ADB light source includes a plurality of semiconductor light emitting elements which are mounted on an identical substrate and are able to individually light up.

10. The vehicular lamp according to claim 1, wherein
a plurality of the second optical systems are disposed adjacent to each other along the predetermined direction behind the front lens body, and the first optical system is disposed adjacent to one end of the plurality of the second optical systems behind the front lens body.

11. A vehicular lamp comprising:
a front lens body extending in a predetermined direction; and
a first optical system and a second optical system disposed adjacent to each other along the predetermined direction behind the front lens body, wherein
the first optical system includes:
a high beam optical system including a high beam rear lens unit disposed behind the front lens body and a high beam light source disposed behind the high beam rear lens unit and emits light which is irradiated forward permeating the high beam rear lens unit and the front lens body in that order to form a high beam light distribution pattern, or
an ADB optical system including an ADB rear lens unit disposed behind the front lens body and an ADB light source disposed behind the ADB rear lens unit and emits light which is irradiated forward permeating the ADB rear lens unit and the front lens body in that order to form an ADB light distribution pattern,
the second optical system includes:
a low beam optical system including a low beam rear lens unit disposed behind the front lens body and a low beam light source disposed behind the low beam rear lens unit and emits light which is irradiated forward permeating the low beam rear lens unit and the front lens body in that order to form a low beam light distribution pattern,
the high beam or the ADB rear lens unit is configured to condense, in a first direction, light from the high beam or the ADB light source which permeates the high beam or the ADB rear lens unit,
the low beam rear lens unit is configured to condense, in the first direction, light from the low beam light source which permeates the low beam rear lens unit,
the front lens body is configured to condense, in a second direction orthogonal to the first direction, light from the high beam or the ADB rear lens unit and the low beam rear lens unit which permeates the front lens body,
the light from the high beam or the ADB light source which permeates the high beam or the ADB rear lens unit and the front lens body forms a first light emitting region in the front lens body, the first light emitting region being viewed in the front lens body when the front lens body is viewed from a light irradiation direction side, and the light from the low beam light source which permeates the low beam rear lens unit and the front lens body forms a second light emitting region which at least partially overlaps with the first light emitting region in the front lens body, the second light emitting region being viewed in the front lens body when the front lens body is viewed from the light irradiation direction side.

12. The vehicular lamp according to claim 11, wherein a diffusion angle in horizontal direction of the light from the high beam or the ADB light source which permeates the high beam or the ADB rear lens unit and the front lens body is a first diffusion angle, a diffusion angle in horizontal direction of the light from the low beam light source which permeates the low beam rear lens unit and the front lens body is a second diffusion angle, the second diffusion angle is larger than the first diffusion angle.

13. The vehicular lamp according to claim 11, wherein a surface shape of a light exit surface of the high beam or the ADB rear lens unit is adjusted so that the diffusion angle in horizontal direction of the light from the high beam or the ADB light source which permeates the high beam or the ADB rear lens unit and the front lens body becomes the first diffusion angle, a surface shape of a light exit surface of the low beam rear lens unit is adjusted so that the diffusion angle in horizontal direction of the light from the low beam light source which permeates the low beam rear lens unit and the front lens body becomes the second diffusion angle.

14. The vehicular lamp according to claim 11, wherein the front lens body is disposed while being inclined at a receding angle with respect to a reference axis which extends in a vehicle width direction when viewed from above, and the first optical system is disposed ahead of the second optical system.

15. The vehicular lamp according to claim 11, wherein the first optical system includes at least the ADB optical system, the ADB light source includes a plurality of semiconductor light emitting elements which are mounted on an identical substrate and are able to individually light up.

16. The vehicular lamp according to claim 12, wherein the first optical system includes at least the ADB optical system, the ADB light source includes a plurality of semiconductor light emitting elements which are mounted on an identical substrate and are able to individually light up.

17. The vehicular lamp according to claim 13, wherein the first optical system includes at least the ADB optical system, the ADB light source includes a plurality of semiconductor light emitting elements which are mounted on an identical substrate and are able to individually light up.

18. The vehicular lamp according to claim 14, wherein the first optical system includes at least the ADB optical system, the ADB light source includes a plurality of semiconductor light emitting elements which are mounted on an identical substrate and are able to individually light up.

* * * * *